(12) United States Patent
Alam

(10) Patent No.: US 9,490,694 B2
(45) Date of Patent: Nov. 8, 2016

(54) HYBRID RESONANT BRIDGELESS AC-DC POWER FACTOR CORRECTION CONVERTER

(71) Applicant: Delta-Q Technologies Corp., Burnaby (CA)

(72) Inventor: Md Muntasir Ul Alam, Burnaby (CA)

(73) Assignee: DELTA-Q TECHNOLOGIES CORP., Burnaby (CA)

( * ) Notice: Subject to any disclaimer, the term of this patent is extended or adjusted under 35 U.S.C. 154(b) by 92 days.

(21) Appl. No.: 14/638,938

(22) Filed: Mar. 4, 2015

(65) Prior Publication Data

US 2015/0263605 A1    Sep. 17, 2015

Related U.S. Application Data

(60) Provisional application No. 61/953,500, filed on Mar. 14, 2014.

(51) Int. Cl.
*H02M 7/217* (2006.01)
*H02M 1/42* (2007.01)
(Continued)

(52) U.S. Cl.
CPC ............ *H02M 1/4241* (2013.01); *H02M 1/44* (2013.01); *H02M 3/33546* (2013.01); *H02M 2001/0058* (2013.01); *Y02B 70/126* (2013.01); *Y02B 70/1491* (2013.01)

(58) Field of Classification Search
CPC ........................... H02M 7/217; H02M 7/2173
USPC .................................. 323/266; 363/89, 127
See application file for complete search history.

(56) References Cited

U.S. PATENT DOCUMENTS 3,938,024 A    2/1976  Clarke
4,412,277 A   10/1983  Mitchell
(Continued)

FOREIGN PATENT DOCUMENTS

CA       2 806 870 A1    4/2014
WO    2010/025596 A1    3/2010

OTHER PUBLICATIONS

Chen et al., "Digital Control for Improved Efficiency and Reduced Harmonic Distortion Over Wide Load Range in Boost PFC Rectifiers," *IEEE Transactions on Power Electronics* 25(10):2683-2692, Oct. 2010.
(Continued)

*Primary Examiner* — Jeffrey Sterrett
(74) *Attorney, Agent, or Firm* — Seed IP Law Group LLP

(57) ABSTRACT

A power converter (e.g., AC-DC converter) includes an input inductor coupled between a first AC voltage source input node and a central node, a first switch coupled between the central node and a first rail node, a second switch coupled between the central node and a second rail node, and a resonant output circuit. The first switch has a body diode that passes current from the first rail node to the central node. The second switch has a body diode that passes current from the central node to the second rail node. A first input device controls current flow between the first rail node and the second AC voltage source input node, and a second input device controls current flow between the second rail node and the second AC voltage source input. The output circuit includes at least one capacitor and at least one inductor which form a resonant network, hence are denominated as resonant capacitor(s) and resonant inductor(s).

22 Claims, 34 Drawing Sheets

(51) Int. Cl.
H02M 3/335 (2006.01)
H02M 1/44 (2007.01)
H02M 1/00 (2006.01)

(56) References Cited

U.S. PATENT DOCUMENTS

| | | | |
|---|---|---|---|
| 4,559,590 | A | 12/1985 | Davidson |
| D305,115 | S | 12/1989 | Kondo et al. |
| 4,885,675 | A | 12/1989 | Henze et al. |
| 5,001,620 | A | 3/1991 | Smith |
| 5,034,871 | A | 7/1991 | Okamoto et al. |
| 5,077,486 | A | 12/1991 | Marson et al. |
| D328,057 | S | 7/1992 | Prager et al. |
| D338,653 | S | 8/1993 | Morgan et al. |
| D351,134 | S | 10/1994 | Hunziker |
| 5,355,300 | A | 10/1994 | Zinn |
| 5,490,057 | A | 2/1996 | Vinciarelli et al. |
| 5,602,462 | A | 2/1997 | Stich et al. |
| D401,216 | S | 11/1998 | Person et al. |
| D427,146 | S | 6/2000 | Wei |
| D427,147 | S | 6/2000 | Wei |
| 6,320,772 | B1 | 11/2001 | Doyama et al. |
| 6,462,966 | B1 | 10/2002 | Leung et al. |
| D489,682 | S | 5/2004 | Guillarme |
| 6,809,678 | B2 | 10/2004 | Vera et al. |
| 6,841,979 | B2 | 1/2005 | Berson et al. |
| 6,847,195 | B2 | 1/2005 | Chen |
| 6,862,201 | B2 | 3/2005 | Hodge, Jr. |
| D505,915 | S | 6/2005 | Hussaini et al. |
| 7,116,090 | B1 | 10/2006 | Yang et al. |
| 7,198,094 | B2 | 4/2007 | Barsun et al. |
| 7,365,987 | B2 | 4/2008 | Jeong |
| 7,616,455 | B2 | 11/2009 | Cameron et al. |
| 8,546,974 | B2 | 10/2013 | Foxall et al. |
| 8,552,695 | B2 | 10/2013 | Stracquadaini |
| 8,598,737 | B2 | 12/2013 | Foxall et al. |
| D703,132 | S | 4/2014 | Pearson et al. |
| 8,803,489 | B2 | 8/2014 | Li et al. |
| 8,861,238 | B2 * | 10/2014 | Huang ............... 363/127 |
| 8,937,469 | B2 | 1/2015 | Clark et al. |
| 2002/0149951 | A1 | 10/2002 | Leung et al. |
| 2005/0105311 | A1 * | 5/2005 | Soldano ............. H02M 1/4225 363/89 |
| 2008/0002444 | A1 * | 1/2008 | Shekhawat ........... H02M 1/34 363/127 |
| 2010/0110593 | A1 | 5/2010 | Kim et al. |
| 2010/0165683 | A1 | 7/2010 | Sugawara |
| 2010/0259240 | A1 | 10/2010 | Cuk |
| 2011/0110127 | A1 | 5/2011 | Lee |
| 2011/0211377 | A1 | 9/2011 | Uno |
| 2011/0292703 | A1 | 12/2011 | Cuk |
| 2012/0069615 | A1 | 3/2012 | Tomioka |
| 2012/0249102 | A1 | 10/2012 | Cuk |
| 2012/0256606 | A1 | 10/2012 | van den Broeke |
| 2013/0051102 | A1 * | 2/2013 | Huang ............... H02M 7/217 363/127 |
| 2013/0235631 | A1 | 9/2013 | Pahlevaninezhad et al. |
| 2014/0056045 | A1 * | 2/2014 | Yan ............... H02M 1/4233 363/126 |
| 2014/0268952 | A1 * | 9/2014 | Tong ............... H02M 1/4241 363/89 |
| 2015/0171734 | A1 * | 6/2015 | Yu ............... H02M 1/12 363/45 |
| 2015/0263605 | A1 * | 9/2015 | Alam ............... H02M 1/4241 363/21.02 |
| 2016/0056730 | A1 * | 2/2016 | Yan ............... H02M 1/4225 363/89 |
| 2016/0099660 | A1 * | 4/2016 | Khaligh ............. H02M 7/217 363/126 |

OTHER PUBLICATIONS

Clark, "Digital Control Techniques for Power Quality Improvements in Power Factor Correction Applications," master's thesis, University of British Columbia, Jul. 2012, 114 pages.
De Gussemé et al., "Digitally Controlled Boost Power-Factor-Correction Converts Operating in Both Continuous and Discontinuous Conduction Mode," *IEEE Transactions on Industrial Electronics 52*(1):88-97, Feb. 2005.
De Gussemé et al., "Input-Current Distortion of CCM Boost PFC Converts Operated in DCM," *IEEE Transactions on Industrial Electronics 54*(2):858-865, Apr. 2007.
De Gussemé et al., "Sample Correction for Digitally Controlled Boost PFC Converters Operating in both CCM and DCM," *Eighteenth Annual IEEE Applied Power Electronics Conference and Exposition 1*:389-395, Feb. 9-13, 2003.
de Souza et al., "A New ZVS-PWM Unity Power Factor Rectifier with Reduced Conduction Losses," *IEEE Transactions on Power Electronics 10*(6):746-752, Nov. 1995.
de Souza et al., "High Power Factor Rectifier with Reduced Conduction and Commutation Losses," $21^{st}$ International Telecommunication Energy Conference, Copenhagen, Jun. 6-9, 1999, 5 pages.
Dixon, "Average Current Mode Control of Switching Power Supplies," Unitrode Application Note U-140, pp. 3-356-3-369, 1990.
Dixon, "Average Current Mode Control of Switching Power Supplies—Topic 5," Unitrode Corporation, pp. 5-1-5-14, 2001, 16 pages.
Erickson et al., *Fundamentals of Power Electronics*, Second Edition, Kluwer Academic Publishers, Secaucus, NJ, 2001, 12 pages, Table of Contents.
Fairchild Semiconductor, "FAN7930: Critical Conduction Mode PFC Controller," Apr. 2010, 22 pages.
Huber et al., "Performance Evaluation of Bridgeless PFC Boost Rectifiers," *IEEE Transactions on Power Electronics 23*(3):1381-1390, May 2008.
Hwang et al., "Seamless Boost Converter Control in Critical Boundary Condition for Fuel Cell Power Conditioning System," IEEE Energy Conversion Congress and Exposition, Sep. 17-22, 2011, pp. 3641-3648.
Hwang et al., "Seamless Boost Converter Control Under the Critical Boundary Condition for a Fuel Cell Power Conditioning System," *IEEE Transactions on Power Electronics 27*(8):3616-3626, Aug. 2012.
Liou et al., "Design and Implementation of a Boost Power Factor Correction Stage Operated in Mixed-Condition Mode," International Conference of Electric Information and Control Engineering (ICEICE), Apr. 15-17, 2011, pp. 2069-2072.
Maksimović et al., "Impact of Digital Control in Power Electronics," *Proceedings of 2004 International Symposium on Power Semiconductor Devices & ICs, Kitakyushu*, pp. 13-22, 2004.
Martinez et al., "A High-Performance Single-Phase Rectifier with Input Power Factor Correction," *IEEE Transactions on Power Electronics 11*(2):311-317, Mar. 1996.
Marvi et al., "A Fully ZVS Critical Conduction Mode Boost PFC," *IEEE Transactions on Power Electronics 27*(4):1958-1965, Apr. 2012.
Moon et al., "Accurate Mode Boundary Detection in Digitally Controlled Boost Power Factor Correction Rectifiers," IEEE Energy Conversion Congress and Exposition (ECCE), Sep. 12-16, 2010, pp. 1212-1217.
Moon et al., "Autotuning of Digitally Controlled Boost Power Factor Correction Rectifiers," *IEEE Transactions on Power Electronics 26*(10):3006-3018, Oct. 2011.
Musavi et al., "A Phase-Shifted Gating Technique With Simplified Current Sensing for the Semi-Bridgeless AC-DC Converter," *IEEE Transactions on Vehicular Technology 62*(4):1568-1576, May 2013.
Roggia et al., "Digital Control System Applied to a PFC Boost Converter Operating in Mixed Conduction Mode," Brazilian Power Electronics Conference (COBEP), Sep. 2-Oct. 1, 2009, pp. 698-704.
Salmon, "Circuit topologies for pwm boost rectifiers operated from 1-phase and 3-phase ac supplies and using either single or split dc rail voltage outputs," $10^{th}$ Annual Applied Power Electronics Conference and Exposition, Dallas, TX, Mar. 5-9, 1995, vol. 1, pp. 473-479.
Salmon, "Circuit Topologies for Single-Phase Voltage-Doubler Boost Rectifiers," *IEEE Transactions on Power Electronics 8*(4):521-529, Oct. 1993.

(56) References Cited

OTHER PUBLICATIONS

Sebastián et al., "The Determination of the Boundaries Between Continuous and Discontinuous Conduction Modes in PWM DC-to-DC Converters Used as Power Factor Preregulators," *IEEE Transactions on Power Electronics* 10(5):574-582, Sep. 1995.

Su et al., "An Interleaved Totem-Pole Boost Bridgeless Rectifier With Reduced Reverse-Recovery Problems for Power Factor Correction," *IEEE Transactions on Power Electronics* 25(6):1406-1415, Jun. 2010.

Tollik et al., "Comparative Analysis of 1-Phase Active Power Factor Correction Topologies," 14$^{th}$ International Telecommunications Energy Conference, Washington, DC, Oct. 4-8, 1992, pp. 517-523.

Tsai et al., "A Family of Zero-Voltage-Transition Bridgeless Power-Factor-Correction Circuits With a Zero-Current-Switching Auxiliary Switch," *IEEE Transactions on Industrial Electronics* 58(5):1848-1855, May 2011.

Van de Sype et al., "Duty-Ratio Feedforward for Digitally Controlled Boost PFC Converters," *IEEE Transactions on Industrial Electronics* 52(1): 108-115, Feb. 2005.

Wang, "A New Single-Phase ZCS-PWM Boost Rectifier With High Power Factor and Low Conduction Losses," *IEEE Transactions on Industrial Electronics* 53(2):500-510, Apr. 2006.

\* cited by examiner

HYBRID RESONANT BRIDGELESS AC-DC POWER FACTOR CORRECTION CONVERTER

FIELD

The present disclosure generally relates to power supplies. Particular embodiments provide bridgeless AC-DC converters for end-use applications such as electric vehicle battery charging.

BACKGROUND

Any device plugged into the electric AC grid and requiring DC power needs a power supply comprising an AC-DC converter with power factor correction (PFC). Examples include, but are not limited to, a battery charger, a telecommunication device, a computing device and an Uninterruptible Power Supply (UPS).

As a specific example, consider an electric vehicle propelled by an electric motor that is supplied with power from a rechargeable battery. The rechargeable battery can be recharged using an AC-DC charger. A proper topology selection for the AC-DC charger with PFC is essential to meet the regulatory requirements of input current harmonics, output voltage regulation and implementation of PFC. Hence, the power supply industry has developed many AC-DC converters with PFC.

FIG. 1 is a circuit diagram of a single-stage boost converter 100 of conventional design, comprising a diode bridge rectifier 110. The single-stage boost converter is the most widely used AC-DC converter for PFC applications. The single-stage boost converter is very simple and achieves near unity power factor if proper control techniques are used. However, the single-stage boost converter has some drawbacks, including high conduction losses and therefore heat management issues in diode bridge rectifier 110.

Unlike the single-stage boost converter of FIG. 1, there is no diode bridge rectifier in a dual boost converter. The dual boost converter reduces the total semiconductor count from six to four, and reduces the losses and associated heat management issues in the diode bridge rectifier. The input voltage in the dual boost converter is floating with respect to ground, and exhibits high common-mode (CM) noise.

FIG. 2A is a circuit diagram of a semi-bridgeless converter 200a of conventional design. It reduces CM noise by adding two slow diodes, $D_3$ and $D_4$, to the dual-boost converter. Semi-bridgeless converter 200a comprises two PFC inductors $L_{in1}$ and $L_{in2}$. Since the return path inductance conducts only a small portion of the total return current, the total converter inductance of the semi-bridgeless converter of FIG. 2A is twice that of the single-stage boost converter of FIG. 1.

FIG. 2B is a circuit diagram of an embodiment of a totem-pole converter 200b. The totem-pole converter 200b overcomes the CM noise issue without adding extra diodes and it does not need the two PFC inductors as the semi-bridgeless converter 200a does. However, the totem-pole converter 200b uses a MOSFET intrinsic body diode to carry the load current, creating a reverse-recovery problem, which makes it unfavorable for use in continuous conduction mode (CCM), high power applications. To reduce the reverse-recovery losses of the body diode, other topologies have been proposed, but their practical implementation is complex.

FIG. 2C is a circuit diagram of an embodiment of a regulated DC to DC converter 200c (see, for example, U.S. Pat. No. 4,559,590). DC to DC converter 200c is an example of an isolated DC to DC converter with zero voltage switching capability. DC to DC converter 200c can be suitable for high voltage, multiple outputs.

In addition to the drawbacks noted for the aforementioned AC-DC topologies (FIGS. 1, 2A and 2B), the circuits inherently have high in-rush current and a lack of lightning and surge protection owing to the direct connection between the AC input voltage and the bus capacitors, through the PFC diode and PFC inductor. Hence, for practical applications the converters described above require in-rush current and surge limiting to prevent damage when a connection is made to AC power.

For high efficiency PFC converters of several hundred Watts and greater (>400 W), in-rush current and surge limiting is typically achieved by placing a current limiting device (for example a resistor or positive-temperature-coefficient device) in series with the PFC circuit and shorting the current limiting device out with a relay after the difference between the bus voltage and peak rectified AC input becomes sufficiently small.

Surge limiting circuits, such as the one described above, add cost, complexity, and often regulatory difficulties when requiring voltage sensing and control of the relay crossing isolation boundaries (for example if there is an isolated DC-DC converter followed by the PFC converter). Surge limiting circuits also need to be tolerant of AC power brownouts and blackouts which again add cost and complexity.

Consider a scenario where an AC surge limiting resistor has been shorted out by the relay and the AC power drops out for several cycles, preventing the PFC converter from maintaining the PFC bus voltage. During this short time, the DC bus-voltage (output voltage of the PFC converter) will drop while it supplies downstream loads. When AC power is restored, the AC input relay will still be shorting out the surge limiting resistor and can allow a potentially damaging surge current to flow through the PFC components and eventually damage the power devices. For this reason, and other related AC power quality issues, a robust surge limiting implementation can be complex and expensive.

While there are examples of converters that limit the in-rush current, those converters are restricted to low power applications (<400 W). FIG. 3 shows an example of a bridgeless converter 300 of conventional design. Bridgeless converter 300 has been configured so that it does not suffer from high in-rush start-up current. Moreover, the implementation of lightning and surge protection is easier compared to the single-stage boost converter of FIG. 1.

Bridgeless converter 300 comprises two pulse width modulation (PWM) switches $S_1$ and $S_2$ (i.e., switches driven via PWM signals). The major drawback of bridgeless converter 300, however, is the voltage spike across the PWM switches $S_1$ and $S_2$ for high frequency and high power applications. As a result, bridgeless converter 300 is restricted to low power applications. Furthermore, bridgeless converter 300 may have other limitations such as only working with complex digital control implementation and variable frequency operation.

Another drawback of bridgeless converter 300 is that the positive AC line cycle and the negative AC line cycle operations are not symmetric, which can increase the complexity of the converter control system.

There is a need for an AC-DC PFC converter that is suitable for use in power supplies for devices connected to the AC grid and that can be configured to overcome the previously stated disadvantages.

SUMMARY

One aspect provides an apparatus comprising a first AC voltage source input connectable to a first AC input line, a second AC voltage source input connectable to a second AC input line, an input inductor electrically coupled between the first AC voltage source terminal and a central node, a first switch electrically coupled between the central node and a first rail node, the first switch having a body diode oriented to pass current from the first rail node to the central node, a second switch electrically coupled between the central node and a second rail node, the second switch having a body diode oriented to pass current from the central node to the second rail node, a first input diode electrically coupled between the first rail node and the second AC voltage source input and oriented to pass current from the first rail node to the second AC voltage source input and, a second input diode electrically coupled between the second rail node and the second AC voltage source input and oriented to pass current from the second AC voltage source input to the second rail node.

Further aspects and details of example embodiments are set forth in the drawings and following detailed discussion.

An AC-DC converter may be summarized as including a first AC voltage source input node connectable to a first AC input line; a second AC voltage source input node connectable to a second AC input line; an input inductor electrically coupled between the first AC voltage source input node and a central node; a first switch electrically coupled between the central node and a first rail node, the first switch having a body diode oriented to pass current from the first rail node to the central node; a second switch electrically coupled between the central node and a second rail node, the second switch having a body diode oriented to pass current from the central node to the second rail node; a first input device electrically coupled between the first rail node and the second AC voltage source input node and oriented to pass current from the first rail node to the second AC voltage source input node, the first input device selected from the group consisting of a diode and a switch; a second input device electrically coupled between the second rail node and the second AC voltage source input node and oriented to pass current from the second AC voltage source input node to the second rail node, the second input device selected from the group consisting of a diode and a switch; an output circuit electrically coupled between the second rail node and the first rail node, the output circuit comprising a resonant circuit electrically connectable in parallel with a load; and a controller communicatively coupled to provide control signals to operate the first and the second switches at a first switching frequency. The output circuit may include a resonant capacitor, a resonant inductor, and a first output device, the resonant capacitor, the resonate inductor and the first output device electrically coupled in series with one another between the first and the second rail nodes, the first output device selected from the group consisting of a diode and a switch. The controller may operate the first and the second switches at the first switching frequency which is lower than a resonant frequency set by the resonant inductor and the resonant capacitor.

The output circuit may further include a second output device electrically coupled to pass current from a node between the resonant inductor and the resonant capacitor via the bad to the first rail node, the second output device selected from the group consisting of a diode and a switch. The AC-DC converter may operates in continuous conduction mode wherein current flows continuously in the input inductor. The controller may provide control signals to operate the switches in either pulse width modulation mode or hybrid resonant mode. The first and the second switches may be electrically coupled to receive a common control signal from the controller.

The AC-DC converter may further include a common output for connecting across a common bad, wherein the first and the second AC voltage source input nodes are electrically connected to the first AC line and the second AC line of a first phase AC input of a three-phase AC supply line.

The output circuit may further include an auxiliary circuit electrically coupled between the first rail node and the second rail node, and a second output device electrically coupled to pass current from a node between the resonant inductor and the first output device via the load to the first rail node, the second output device selected from the group consisting of a diode and a switch. The auxiliary circuit may include an auxiliary capacitor and an auxiliary switch electrically coupled in series with one another between the first and the second rail nodes, the auxiliary switch comprising a body diode oriented to pass current from the second rail node to the first rail node.

The controller may be further communicatively coupled to drive the auxiliary switch to switch in response to a zero-crossing event of at least one of a current or a voltage.

The output circuit may further include an auxiliary circuit electrically coupled to pass current from a node between the resonant capacitor and the resonant inductor to the first rail node, and a second output device electrically coupled to pass current from a node between the resonant inductor and the first output device via the load to the first rail node, the second output device selected from the group consisting of a diode and a switch. The auxiliary circuit may include an auxiliary capacitor and an auxiliary switch electrically coupled in series with one another between the first and the second rail nodes, the auxiliary switch comprising a body diode oriented to pass current from the node between the resonant capacitor and the resonant inductor to the first rail node.

The output circuit may include a first resonant capacitor; and an isolation transformer having a primary winding and a secondary winding, the first resonant capacitor and the primary winding of the isolation transformer electrically coupled in series between the second rail node and the first rail node.

The output circuit may further include a second resonant capacitor; a resonant inductor; and a first output device selected from the group consisting of a diode and a switch, the second resonant capacitor, the resonant inductor and the first output device each electrically coupled in series with one another across the secondary winding of the isolation transformer.

The output circuit may further include a second output device electrically coupled to pass current from a node between the resonant inductance and the resonant capacitance via the load to a node between the second output device and the secondary winding of the isolation transformer, the second output device selected from the group consisting of a diode and a switch.

The output circuit may further include a second resonant capacitor; a third resonant capacitor; a resonant inductor; a first output device selected from the group consisting of a diode and a switch; and a second output device selected from the group consisting of a diode and a switch, the first output device and the second resonant capacitor electrically coupled in series with one another across the secondary winding of the isolation transformer, the second output device, the second resonant capacitor, and the resonant inductor electrically coupled in series with one another across the secondary winding of the isolation transformer, electrically coupled in parallel with the first output device and the second resonant capacitor.

The output circuit may further include a second resonant capacitor; a resonant inductor; a first output device selected from the group consisting of a diode and a switch; a second output device selected from the group consisting of a diode and a switch, a third output device selected from the group consisting of a diode and a switch; and a fourth output device selected from the group consisting of a diode and a switch, the second resonant capacitor, the first output device and the third output device electrically coupled in series with one another across the secondary winding of the isolation transformer, the resonant inductor, the second output device and the fourth output device electrically coupled in series with one another across the secondary winding of the isolation transformer, electrically coupled in parallel with the second resonant capacitor, the first output device and the third output device.

The output circuit may further include a resonant inductor electrically coupled in series with the first resonant capacitor; and an auxiliary circuit electrically coupled between the first rail node and the second rail node, the auxiliary circuit comprising an auxiliary capacitor and an auxiliary switch, the auxiliary switch comprising a body diode oriented to pass current from the second rail node to the first rail node.

The output circuit may further include a resonant inductor electrically coupled in series with the first resonant capacitor; and an auxiliary circuit electrically coupled to pass current from a node between the first resonant capacitor and the resonant inductor to the first rail node, the auxiliary circuit comprising an auxiliary capacitor and an auxiliary switch, the auxiliary switch comprising a body diode oriented to pass current from the second rail node to the first rail node.

A two-stage AC-DC converter comprising a first AC-DC stage and a second DC-DC stage, the first AC-DC stage may be summarized as including a first AC voltage source input node connectable to a first AC input line; a second AC voltage source input node connectable to a second AC input line; an input inductor electrically coupled between the first AC voltage source input node and a central node; a first switch electrically coupled between the central node and a first rail node, the first switch having a body diode oriented to pass current from the first rail node to the central node; a second switch electrically coupled between the central node and a second rail node, the second switch having a body diode oriented to pass current from the central node to the second rail node; a first input device electrically coupled between the first rail node and the second AC voltage source input node and oriented to pass current from the first rail node to the second AC voltage source input node, the first input device selected from the group consisting of a diode and a switch; a second input device electrically coupled between the second rail node and the second AC voltage source input node and oriented to pass current from the second AC voltage source input node to the second rail node, the second input device selected from the group consisting of a diode and a switch; a controller communicatively coupled to provide control signals to operate the first and the second switches at a first switching frequency; and an output circuit electrically coupled between the second rail node and the first rail node, the output circuit comprising a resonant circuit electrically connected to the second DC-DC stage, the second DC-DC stage electrically connectable to a load.

The first AC-DC stage may have a first output DC voltage, and the second DC-DC stage may have a second output DC voltage, the first output DC voltage different from the second output DC voltage.

DEFINITION OF TERMS

Pulse Width Modulation (PWM) Mode: A mode of operation of a power supply in which pulse width modulation is used. Pulse width modulation conforms pulse duration based on modulator signal information. PWM can be used to allow the control of power supplied to an electrical load without incurring the losses that would result from linear power delivery by resistive means.

Hybrid Resonant PWM Mode: A mode of operation of a power supply in which switches operate in both PWM mode and resonant mode.

Continuous Conduction Mode (CCM): A mode of operation in which the current is flowing continuously in the energy transfer inductor during the entire switching cycle in steady state operation.

On-Time Interval: The time interval during which the PWM switches are ON.

Resonant Frequency: Resonance of a circuit involving capacitors and inductors occurs because the collapsing magnetic field of the inductor generates an electric current in its windings that charges the capacitor, and then the discharging capacitor provides an electric current that builds the magnetic field in the inductor. This process is repeated continually. The resonant frequency $f_r = 2\pi\sqrt{(L_r \cdot C_r)}$ where $L_r$ is the resonant inductance and $C_r$ is the resonant capacitance.

Positive AC half-cycle: Refers to the half-cycle when the line voltage is positive.

Negative AC half-cycle: Refers to the half-cycle when the line voltage is negative.

Zero-Current-Switching (ZCS): Refers to a switching transition at a time when there is essentially no current flowing through the switch.

Zero-Voltage-Switching (ZVS): Refers to a switching transition at a time when the voltage across the switch is essentially zero.

DETAILED DESCRIPTION OF PREFERRED EMBODIMENT(S)

In the circuit diagrams of FIGS. 1-4, 5B, 6-9, 10B, and 11-28, like symbols (such as $D_1$, $D_2$, $C_r$, and $L_r$) are used to illustrate similar or equivalent components. The instance or value of components with the same symbols in different figures can be different, however, from one figure to another.

Figure 4:
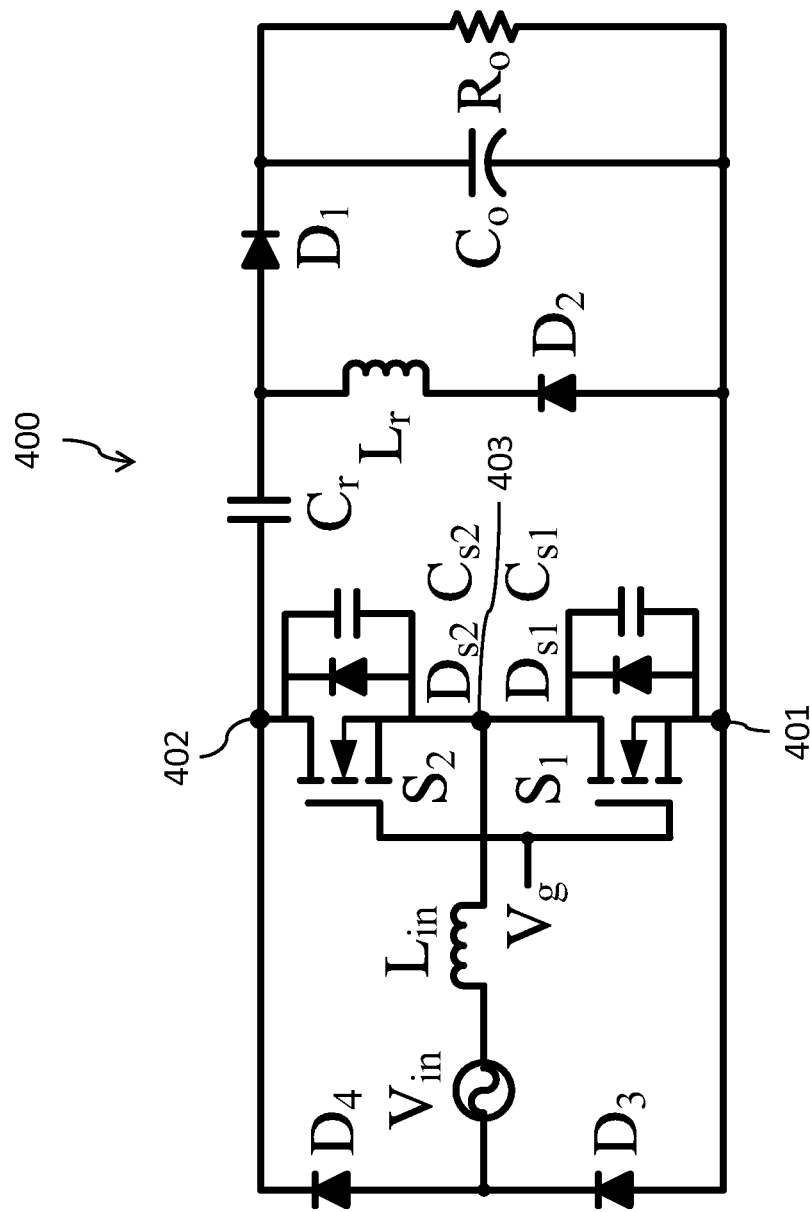
FIG. 4 is a circuit diagram of a first embodiment of a hybrid resonant PWM (HRPWM) AC-DC converter, according to the teachings of the present application.

FIG. 4 is a circuit diagram of a first embodiment of a hybrid resonant PWM (HRPWM) AC-DC converter 400. HRPWM converter 400 is bridgeless and comprises switches $S_1$ and $S_2$, which may be referred to as "PWM switches", and associated diodes $D_{s1}$ and $D_{s2}$ and body capacitors $C_{s1}$ and $C_{s2}$, respectively. HRPWM converter 400 further comprises diodes $D_1$ through $D_4$, resonant capacitor $C_r$ and resonant inductor $L_r$. Resonant capacitor $C_r$, resonant inductor $L_r$ and diode $D_2$ are electrically connected in series between nodes 402 and 401. Diode $D_1$ is connected to pass current from a node between resonant capacitor $C_r$ and resonant inductor $L_r$ via a load (represented in FIG. 4 by capacitor $C_O$ and resistor $R_O$) to node 401.

In the FIG. 4 example, an AC voltage source $V_{in}$ has one terminal connected to a central node 403 between the switches $S_1$ and $S_2$ through an input inductor L. The other terminal of $V_{in}$ is connected to a point between diodes $D_3$ and $D_4$, with diodes $D_3$ and $D_4$ connected in series between nodes 401 and 402 in the circuit of FIG. 4. Switch $S_1$, the associated diode $D_{s1}$ and body capacitor $C_{s1}$ are all connected in parallel between central node 403 and node 401, and switch $S_2$, the associated diode $D_{s2}$ and body capacitor $C_{s2}$ are all connected in parallel between central node 403 and node 402.

In implementation of HRPWM converter 400, switches $S_1$ and $S_2$, and associated diodes $D_{s1}$ and $D_{s2}$ and body capacitors $C_{s1}$ and $C_{s2}$, can be implemented using MOSFETs and/or GaN devices.

Switches $S_1$ and $s_2$ can operate in either pulse width modulation (PWM) mode or hybrid resonant mode. In hybrid resonant mode, the resonant frequency has a significant impact on operation of HRPWM converter 400. The resonant frequency can be higher, lower or equal to the switching frequency. The modes of operation are described in the following paragraphs.

When the resonant period is greater than twice the on-tune interval associated with switches $S_1$ and $S_2$, the switching frequency is higher than the resonant frequency, and HRPWM converter 400 is said to operate in an "above resonance" mode. In "above resonance" mode, diode $D_2$ of FIG. 4 is forced to turn off even though it is carrying a large resonant current. The impact of such an abrupt turn-off is increased switching losses and increased electromagnetic interference (EMI). There can also be a duty cycle loss.

When the resonant period is substantially equal to twice the on-time Interval associated with switches $S_1$ and $S_2$, the resonant frequency is substantially equal to the switching frequency, and HRPWM converter 400 is said to operate in a "resonant frequency" mode. In "resonant frequency" mode, diode $D_2$ of FIG. 4 is turned off at substantially zero resonant current, thereby reducing or eliminating switching losses and reducing electromagnetic interference (EMI). To maintain a constant on-time interval associated with switches $S_1$ and $S_2$, HRPWM converter 400 would need to operate with a variable switching frequency. This would be undesirable since it would increase the complexity of HRPWM converter 400 and render its design more challenging.

When the resonant period is less than twice the on-time interval associated with switches $S_1$ and $S_2$, the switching frequency is lower than the resonant frequency, and HRPWM converter 400 is said to operate in a "below resonance" mode. In "below resonance" mode, diode $D_2$ of FIG. 4 is turned off at substantially zero resonant current thereby reducing or eliminating turn-off losses. In "below resonance" mode, HRPWM converter 400 does not require a variable switching frequency. "Below resonance" operation can be implemented using a standard average current-mode control IC.

HRPWM converter 400 comprises a gating signal $V_g$ for switches $S_1$ and $S_2$. In some embodiments, gating signal $V_g$ is the same for both switches $S_1$ and $S_2$. In other embodiments, separate gating signals (not shown in FIG. 4) can be provided for switches $S_1$ and $S_2$.

Figure 5A:
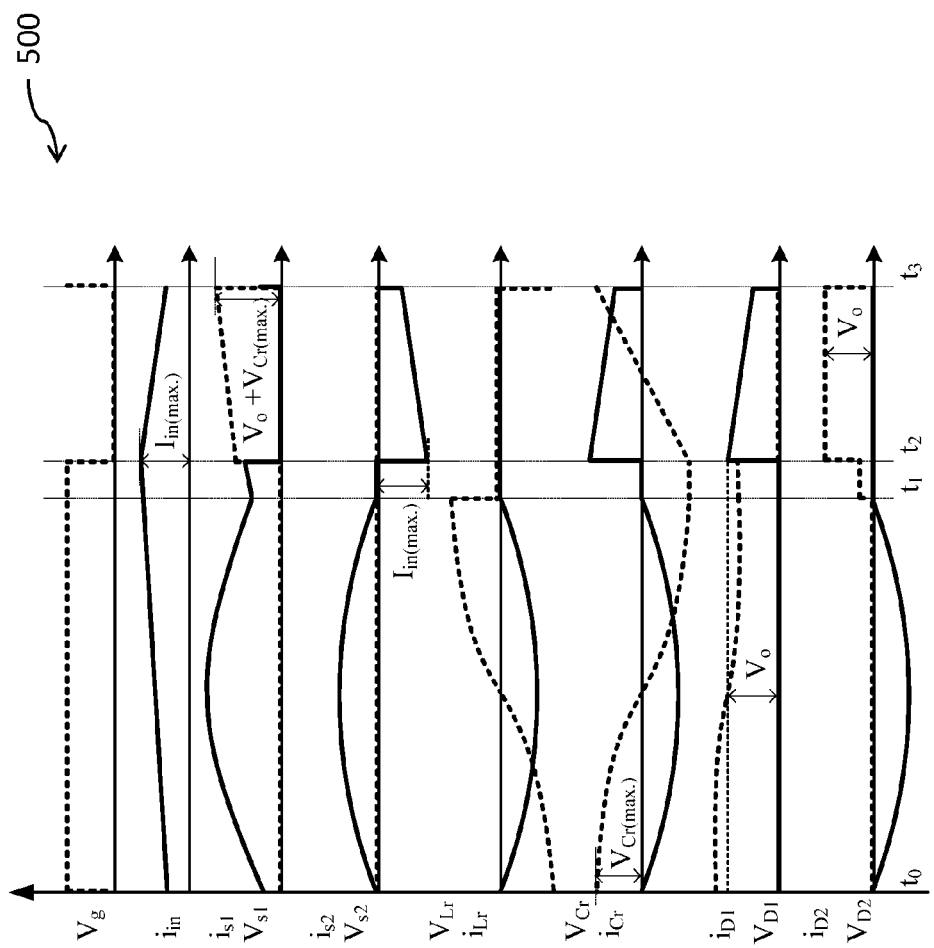
FIG. 5A is a diagram illustrating waveforms in continuous conduction mode (CCM) for the HRPWM AC-DC converter of FIG. 4, according to the teachings of the present application.
Figure 6:
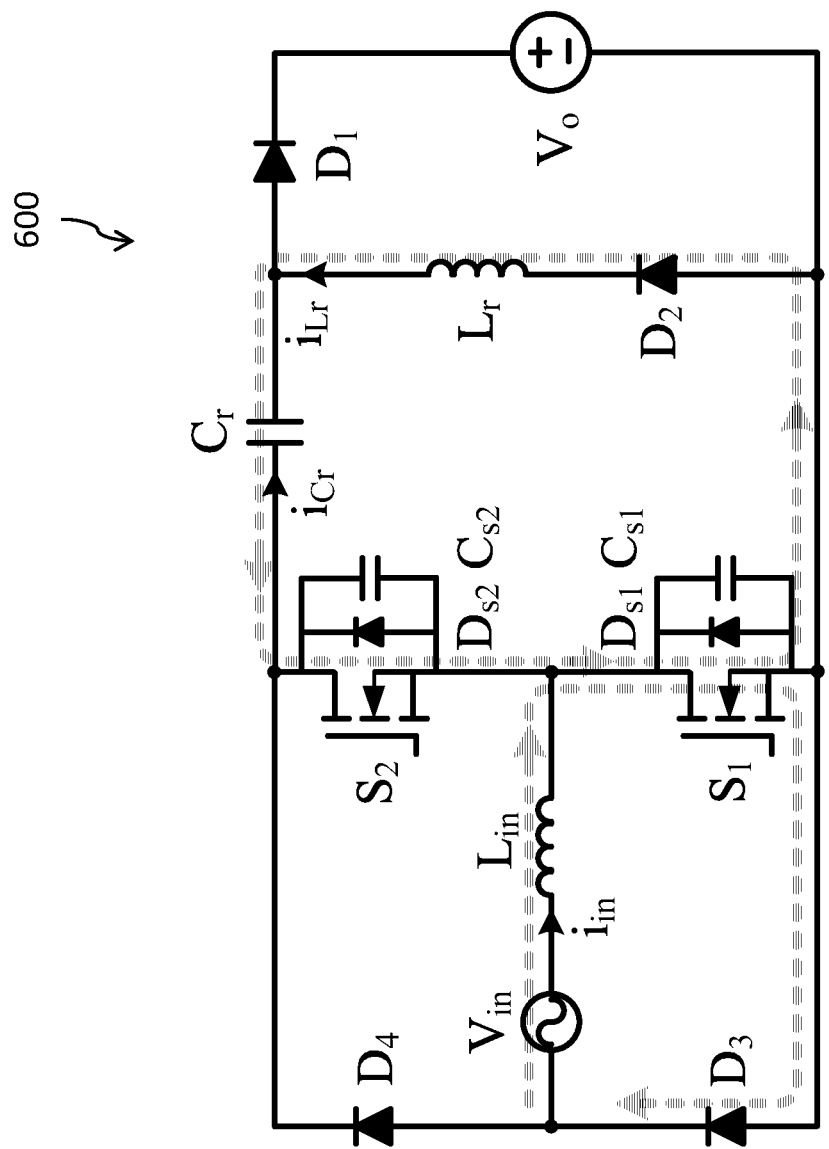
FIG. 6 illustrates the current path during positive half-line cycle operation for a first time interval of the waveforms of FIG. 5A.
Figure 7:
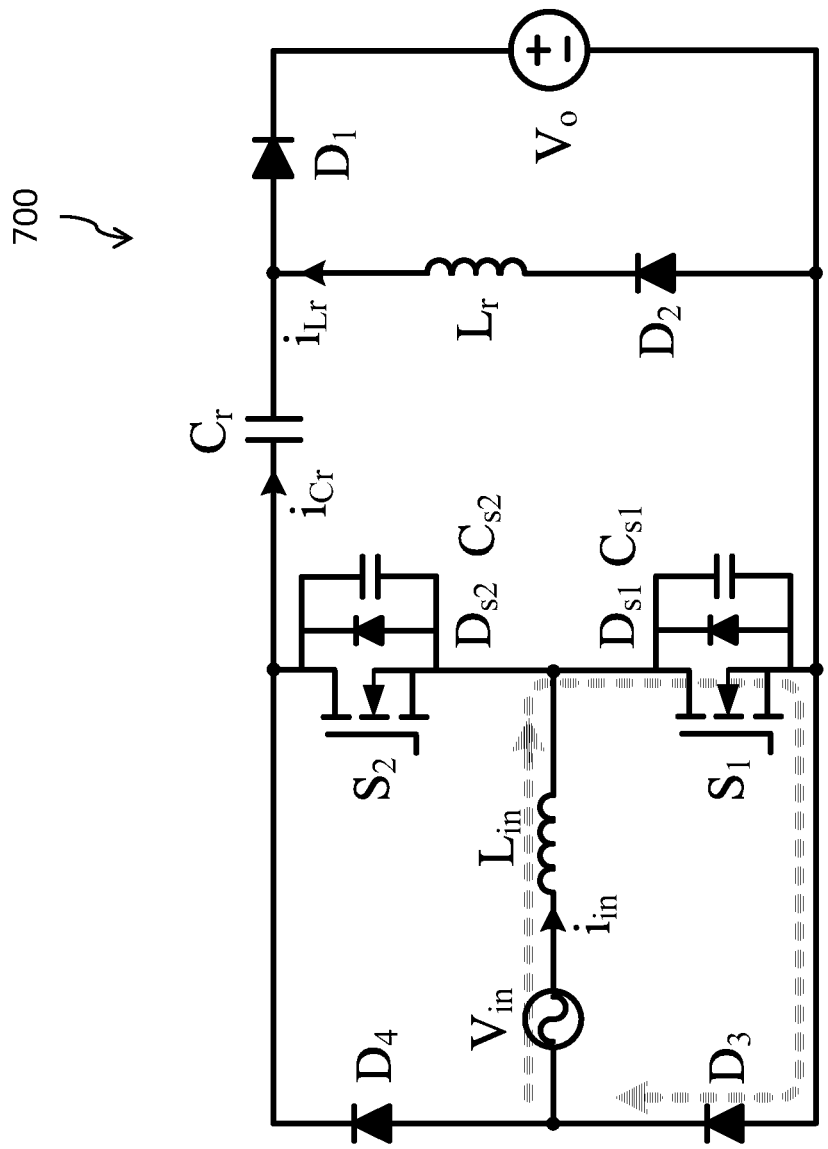
FIG. 7 illustrates the current path during positive half-line cycle operation for a second time interval of the waveforms of FIG. 5A.
Figure 8:
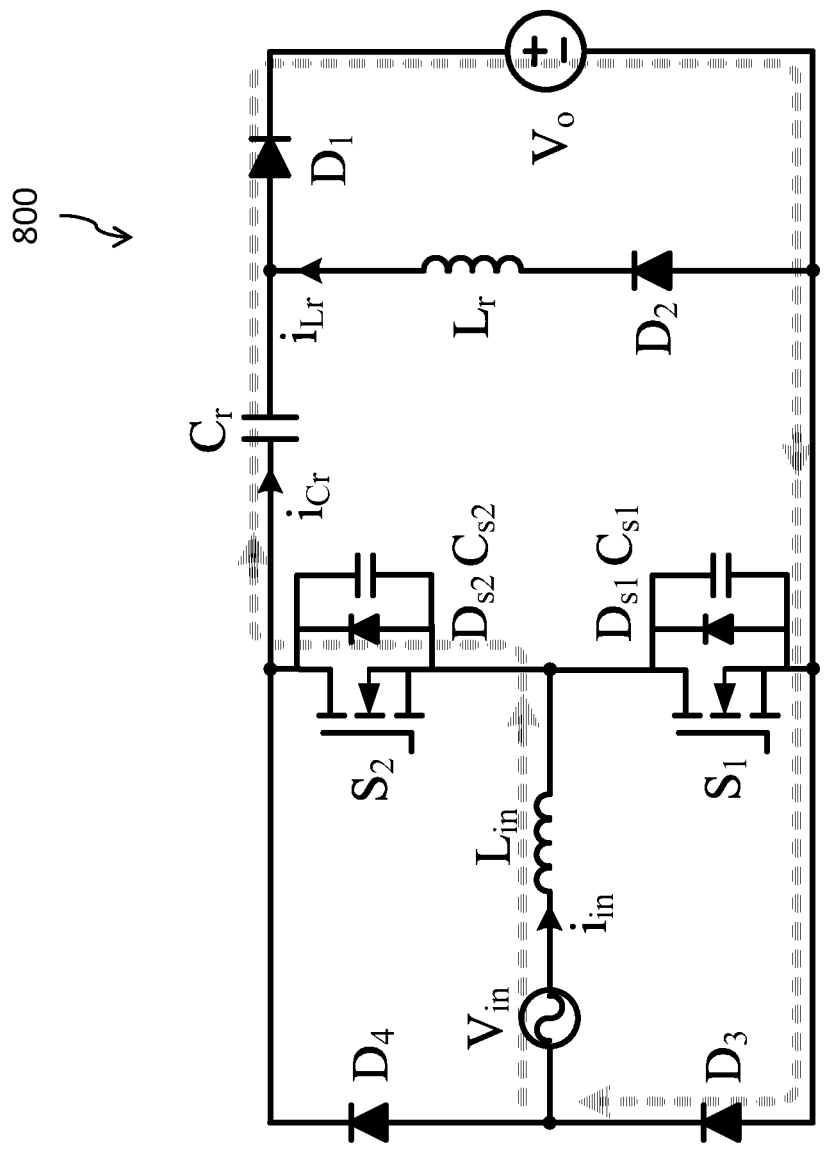
FIG. 8 illustrates the current path during positive hall-line cycle operation for a third time interval of the waveforms of FIG. 5A.

FIG. 5A is a diagram illustrating current and voltage waveforms 500 in continuous conduction mode (CCM) for HRPWM AC-DC converter 400 of FIG. 4 during positive half-cycle operation (e.g. when the AC line voltage is positive). FIGS. 6-8 show current flows during different time intervals of the waveforms 500. During negative half-cycle operation (e.g., when the AC line voltage is negative), corresponding current and voltage waveforms would be present, but with polarities reversed, and with the waveforms $i_{s1}$ and $V_{s1}$ for switch $S_1$ corresponding to the waveforms $i_{s2}$ and $V_{s2}$ for switch $S_2$ shown in FIG. 5A, and vice versa. For example, during negative half-cycle operation current flows through $D_4$, instead of $D_3$ as shown in FIGS. 6-8. Current waveforms in FIG. 5A are shown with solid lines and voltage waveforms are shown with dashed lines.

In the FIG. 5A example:

$V_g$ is the voltage applied to the gates of switches $S_1$ and $S_2$;

$i_{in}$ is the current through $L_{in}$;

$i_{s1}$ is the current through $S_1$ and/or $D_{s1}$, or the current charging or discharging $C_{s1}$;

$V_{s1}$ is the voltage difference between central node 403 between the switches $S_1$ and $S_2$ and node 401 of FIG. 4;

$i_{s2}$ is the current through $S_2$ and/or $D_{s2}$, or the current charging or discharging $C_{s2}$;

$V_{s2}$ is the voltage difference between node 402 and central node 403 of FIG. 4;

$i_{Lr}$ is the current through resonant inductor $L_r$;

$V_{Lr}$ is the voltage across resonant inductor $L_r$;

$i_{Cr}$ is the current charging or discharging resonant capacitor $C_r$;

$V_{Cr}$ is the voltage across resonant capacitor $C_r$.

Figure 5B:
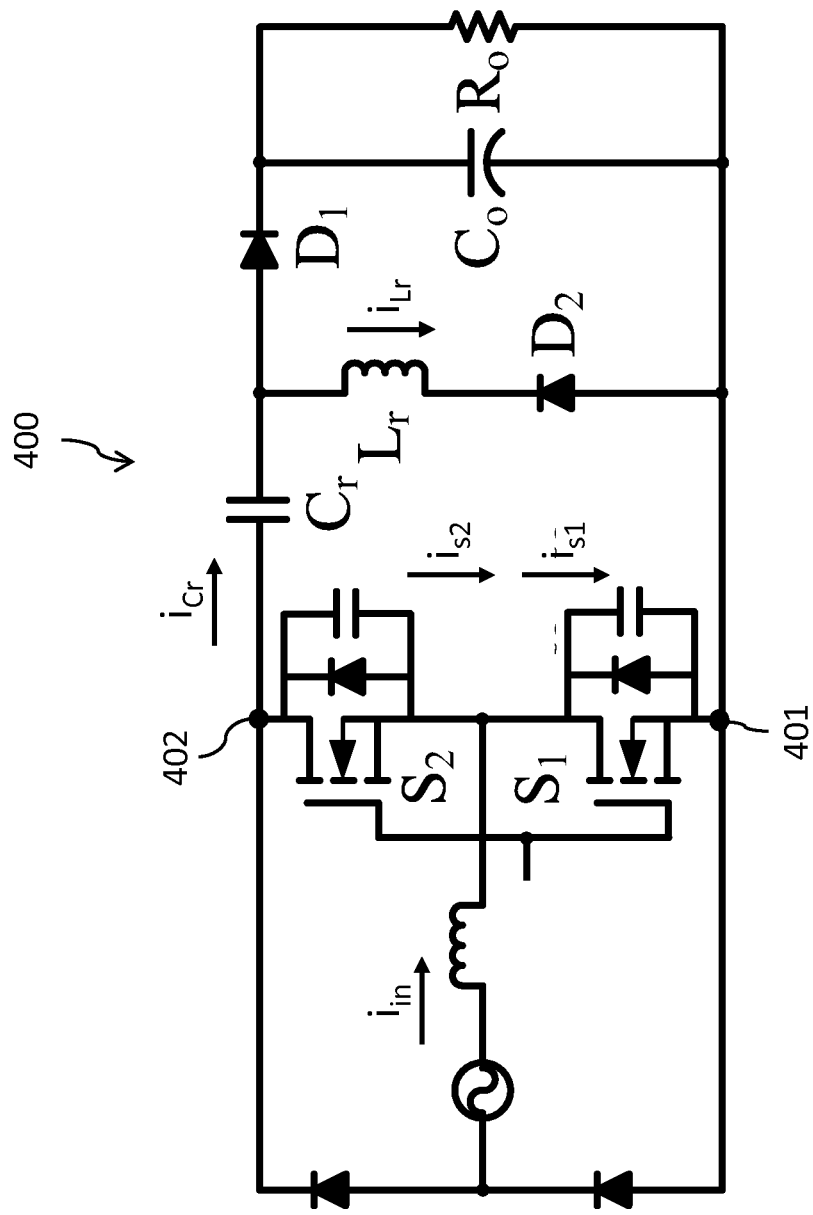
FIG. 5B shows reference directions on the circuit of FIG. 4 for the currents in FIG. 5A.

The signs of the currents (positive vs negative) are determined with reference to the directions shown in FIG. 5B.

Referring to FIG. 5A, a first time interval is defined as time interval $(t_0-t_1)$. The first time interval starts when switches $S_1$ and $S_2$ are turned on. Input current $i_{in}$ (shown in FIG. 5A) stores energy in input inductor $L_{in}$ (shown in FIG. 4). The first interval ends when resonant current $i_{Lr}$ is substantially zero, enabling diode $D_2$ to achieve zero-current-switching (ZCS) turn-off.

FIG. 6 illustrates the current path during positive half-line cycle operation for the first time interval of waveforms 500 of FIG. 5A.

Referring again to FIG. 5A, a second time interval is defined as time interval $(t_1-t_2)$. The second time interval starts when $D_2$ stops conducting and there is substantially no current in the resonant branch of the circuit shown in FIG. 4. In the second interval, inductor $L_{in}$ stores energy similar to a traditional boost operation. The second interval ends when switches $S_1$ and $S_2$ are turned off.

FIG. 7 illustrates the current path during positive half-line cycle operation for the second time interval of the waveforms of FIG. 5A.

Referring again to FIG. 5A, a third time interval is defined as time interval $(t_2-t_3)$. In the third time interval, energy stored in input inductor $L_{in}$ is transferred to a load. The third interval ends when switches $S_1$ and $S_2$ are turned on, and operation returns to the start of the first time interval. The sequence of time intervals—from the first time interval to the third time interval—repeats.

FIG. 8 illustrates the current path during positive half-line cycle operation for the third time interval of the waveforms of FIG. 5A.

In an example application of HRPWM converter 400, the output power is 650 W, the AC input voltage is in the range 85V to 265V, the output voltage is 400V, and the switching frequency is 70 kHz. In a preferred embodiment for the example application, the resonant frequency is 65 kHz, resonant capacitor $C_r$ is 1 μF and resonant inductor $L_r$ is 6 μH.

Figure 1:
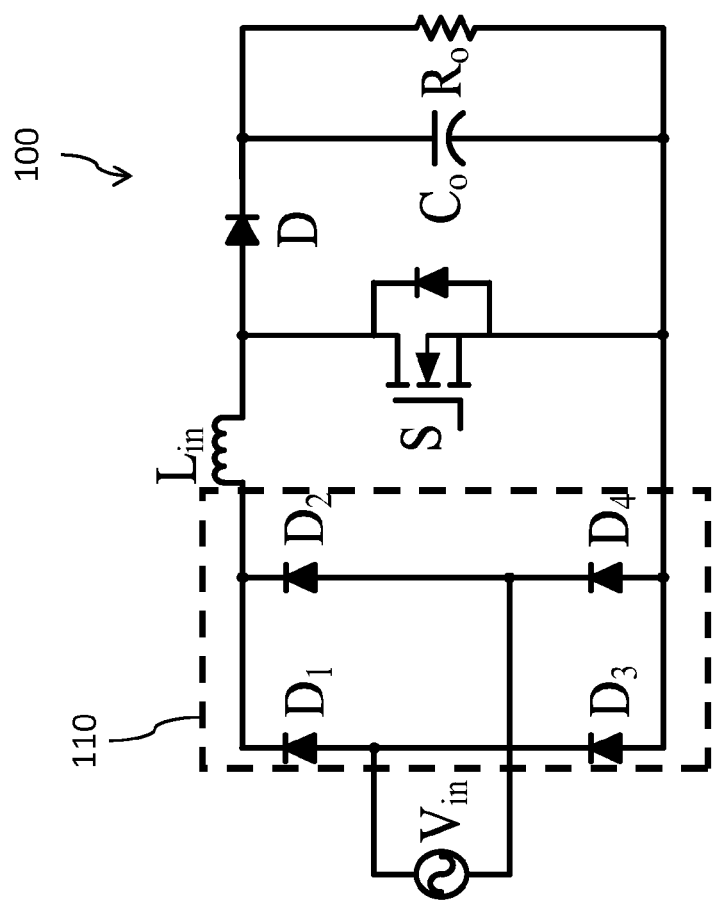
FIG. 1 is a circuit diagram of a single-stage boost converter of conventional design comprising a diode bridge rectifier.
Figure 2A:
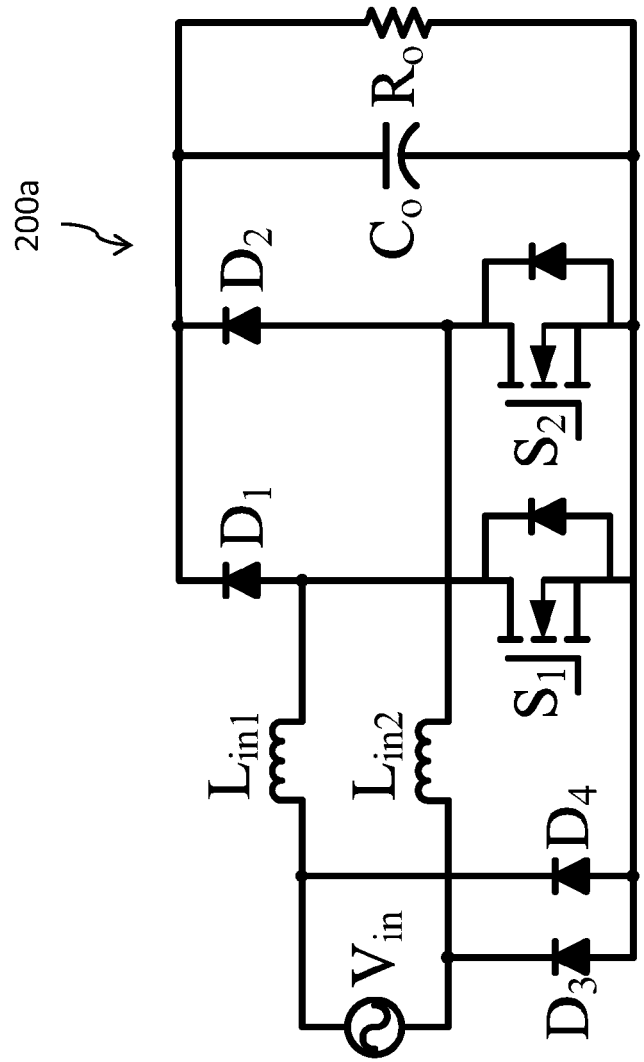
FIG. 2A is a circuit diagram of a semi-bridgeless converter of conventional design.
Figure 2B:
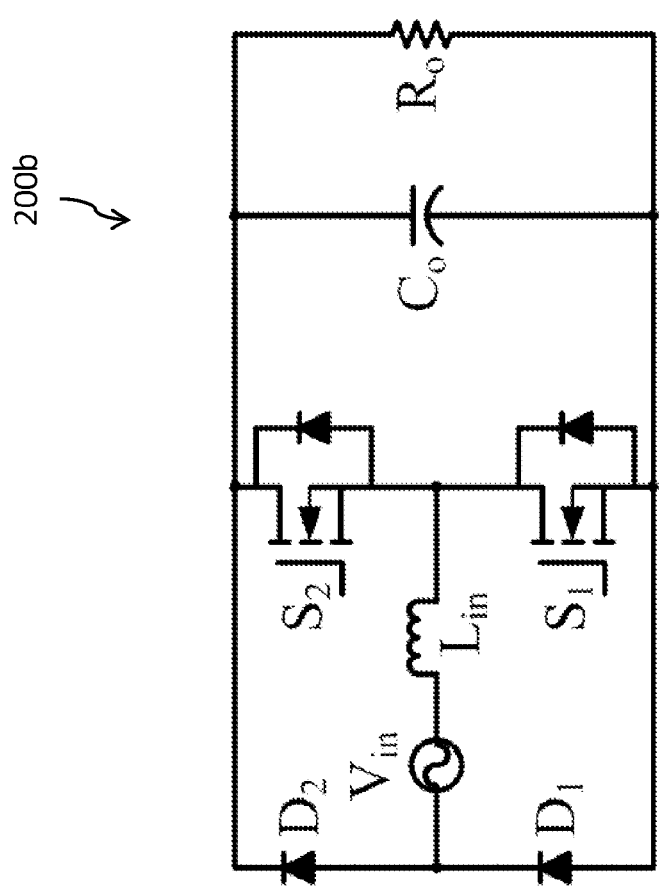
FIG. 2B is a circuit diagram of an embodiment of a totem-pole converter of conventional design.
Figure 2C:
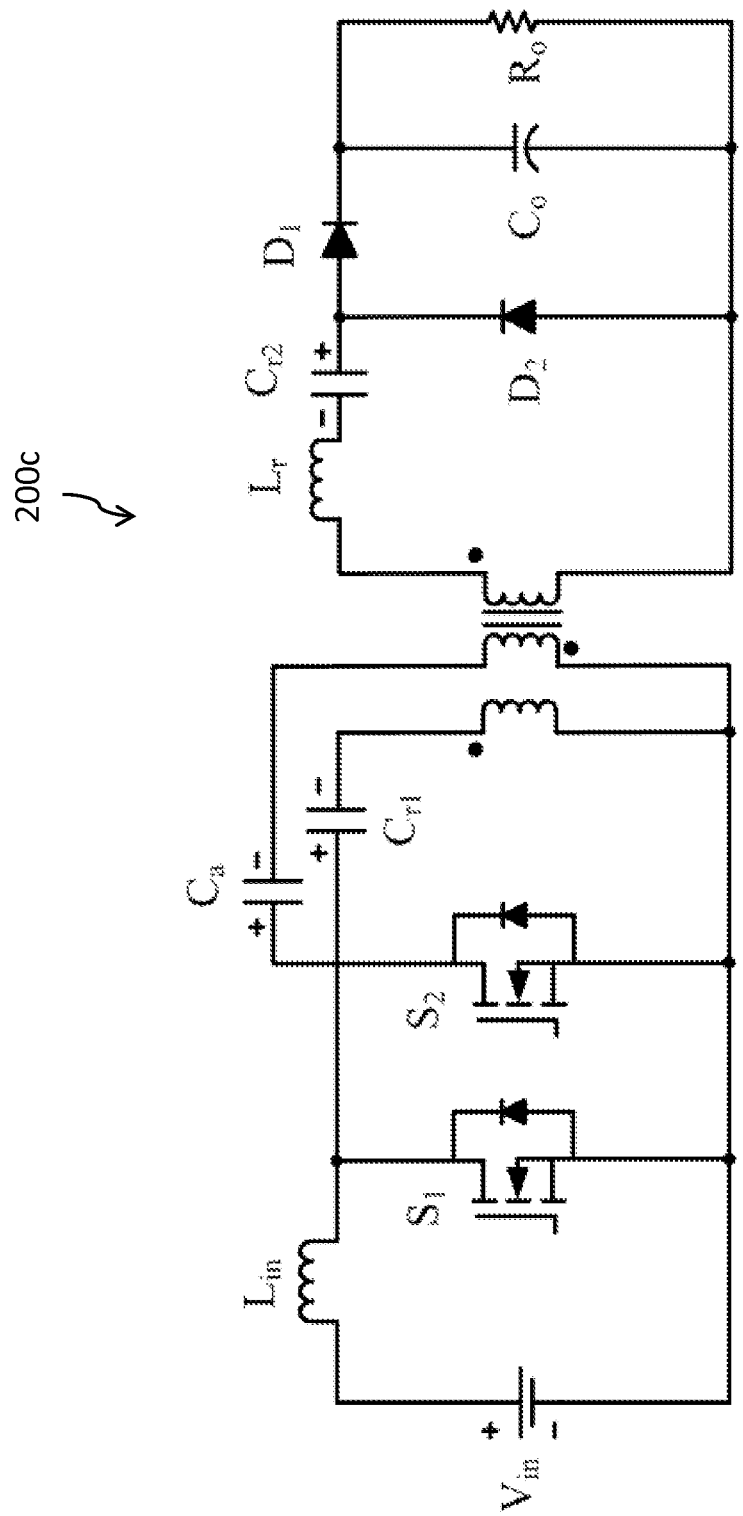
FIG. 2C is a circuit diagram of an embodiment of a regulated DC to DC converter.
Figure 3:
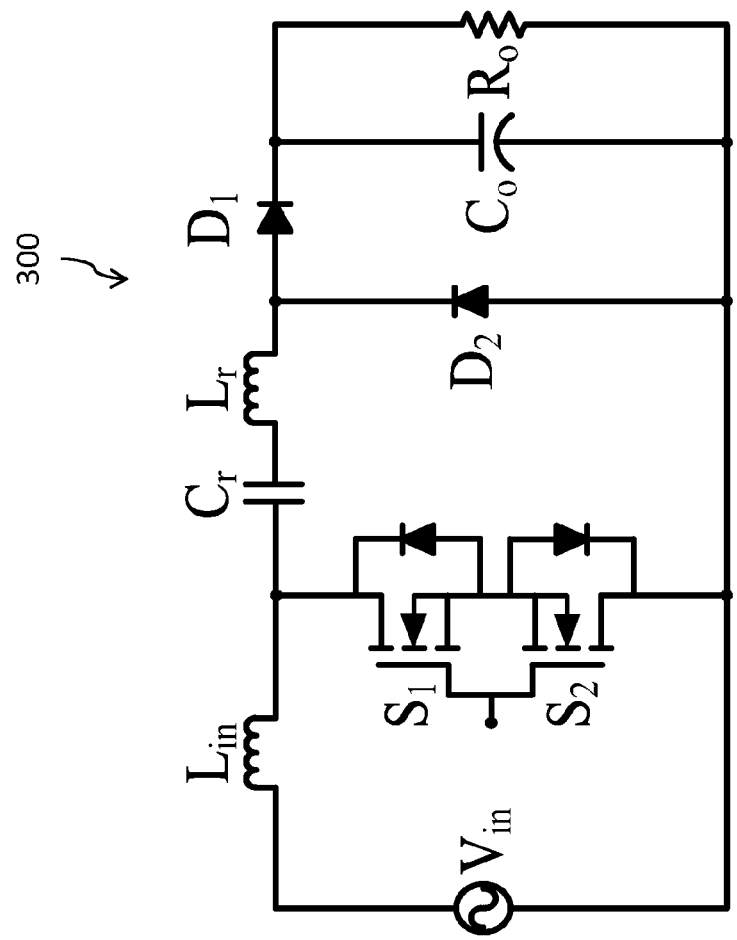
FIG. 3 is an example of a bridgeless converter of conventional design.

HRPWM converter 400 has no diode bridge rectifier (such as diode bridge rectifier 110 of FIG. 1) and consequently has reduced heat management complexity relative to single-stage boost converter 100 of FIG. 1 and other converters comprising a diode bridge rectifier.

HRPWM converter 400 exhibits low CM noise, its start-up in-rush current is low, and it has inherent lightning and surge protection.

HRPWM converter 400 can operate with standard average current-mode control, and can operate in continuous conduction mode (CCM).

The voltage stress across switches $S_1$ and $S_2$ is limited to the sum of the output voltage (that is, the voltage across the load, the load comprising resistance $R_0$ and capacitance $C_0$), and the voltage across resonant capacitor $C_r$.

Figure 9:
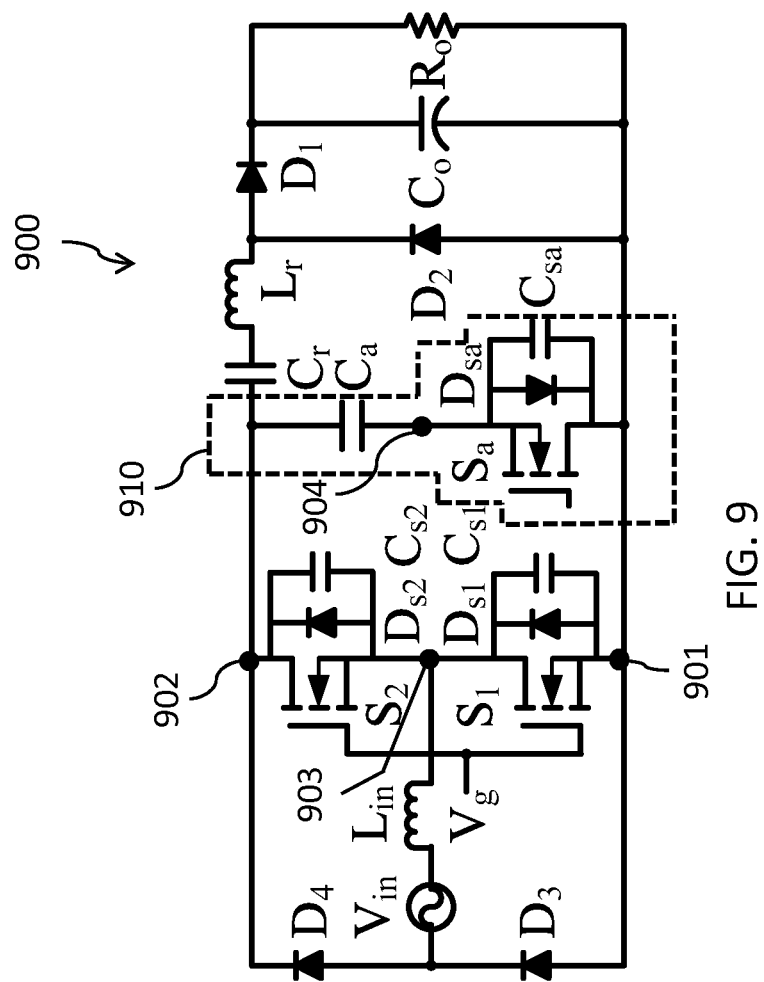
FIG. 9 is a circuit diagram of a first embodiment of a hybrid resonant PWM (HRPWM) zero-voltage-switching (ZVS) AC-DC converter, according to the teachings of the present application.

FIG. 9 is a circuit diagram of an embodiment of a hybrid resonant PWM (HRPWM) zero-voltage-switching ZVS AC-DC converter 900. HRPWM ZVS converter 900 is bridge-less and comprises switches $S_1$, $S_2$ and $S_a$, and associated diodes $D_{s1}$, $D_{s2}$ and $D_{sa}$, and body capacitors $C_{s1}$, $C_{s2}$ and $C_{sa}$ respectively.

In implementation of HRPWM ZVS converter 900, switches $S_1$, $S_2$ and $S_a$, and associated diodes $D_{s1}$, $D_{s2}$ and $D_{sa}$, and body capacitors $C_{s1}$, $C_{s2}$ and $C_{sa}$, can be implemented using MOSFETs and/or GaN devices. HRPWM ZVS converter 900 can achieve ZVS turn-on for switches $S_1$, $S_2$ and $S_a$. Nodes 901, 902 and 903 correspond to nodes 401, 402 and 403 discussed above.

HRPWM ZVS converter 900 further comprises auxiliary circuit element 910. In the illustrated example, auxiliary circuit element 910 comprises capacitor $C_a$, switch $S_a$ and associated body capacitor $C_{sa}$ and body diode $D_{sa}$. A node 904 is between capacitor $C_a$ and switch $S_a$. Auxiliary circuit element 910 is provided to avoid high voltage across the PWM switches $S_1$ and $S_2$. Auxiliary circuit element 910 can have different configurations in other embodiments. For example, in some embodiments any suitable snubber circuit can be used as auxiliary circuit element 910.

HRPWM ZVS converter 900 further comprises diodes $D_1$ through $D_4$, resonant capacitor $C_r$, and resonant inductor $L_r$.

HRPWM ZVS converter 900 comprises a gating signal $V_g$ for switches $S_1$ and $S_2$. In some embodiments, gating signal $V_g$ is the same for both switches $S_1$ and $S_2$. In other embodiments, separate gating signals (not shown in FIG. 9) can be provided for switches $S_1$ and $S_2$.

Figure 10A:
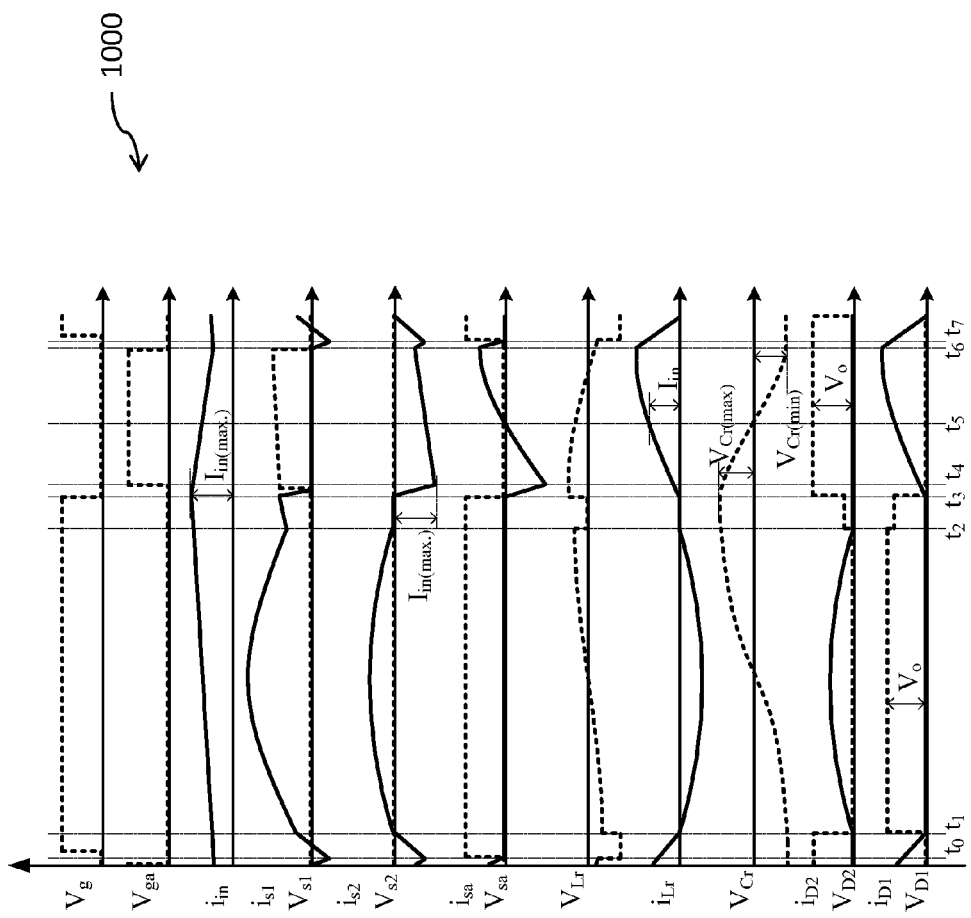
FIG. 10A is a diagram illustrating waveforms in continuous conduction mode (CCM) for the HRPWM ZVS AC-DC converter of FIG. 9.

FIG. 10A is a diagram illustrating waveforms 1000 in continuous conduction mode (CCM) for HRPWM ZVS AC-DC converter 900 of FIG. 9 during positive half-cycle operation (e.g. when the AC line voltage is positive). During negative half-cycle operation (e.g., when the AC line voltage is negative), corresponding current and voltage waveforms would be present, but with polarities reversed, and with the waveforms $i_{s1}$ and $V_{s1}$ for switch $S_1$ corresponding to the waveforms $i_{s2}$ and $V_{s2}$ for switch $S_2$ shown in FIG. 10A, and vice versa. Current waveforms are shown with solid lines and voltage waveforms are shown with dashed lines.

In the FIG. 10A example:

$V_g$ is the voltage applied to the gates of switches $S_1$ and $S_2$;

$V_{ga}$ is the voltage applied to the gate of switch $S_a$;

$i_{in}$ is the current through $L_{in}$;

$i_{s1}$ is the current through $S_1$ and/or $D_{s1}$, or the current charging or discharging $C_{s1}$;

$V_{s1}$ is the voltage difference between central node 903 between the switches $S_1$ and $S_2$ and node 901 of FIG. 9;

$i_{s2}$ is the current through $S_2$ and/or $D_{s2}$, or the current charging or discharging $C_{s2}$;

$V_{s2}$ is the voltage difference between node 902 of FIG. 9 and central node 903 between the switches $S_1$ and $S_2$;

$i_{sa}$ is the current through $S_a$ and/or $D_{sa}$, or the current charging or discharging $C_{sa}$;

$V_{sa}$ is the voltage difference between node 901 and node 904 of FIG. 9;

$V_{Cr}$ is the voltage across resonant capacitor $C_r$.

Figure 10B:
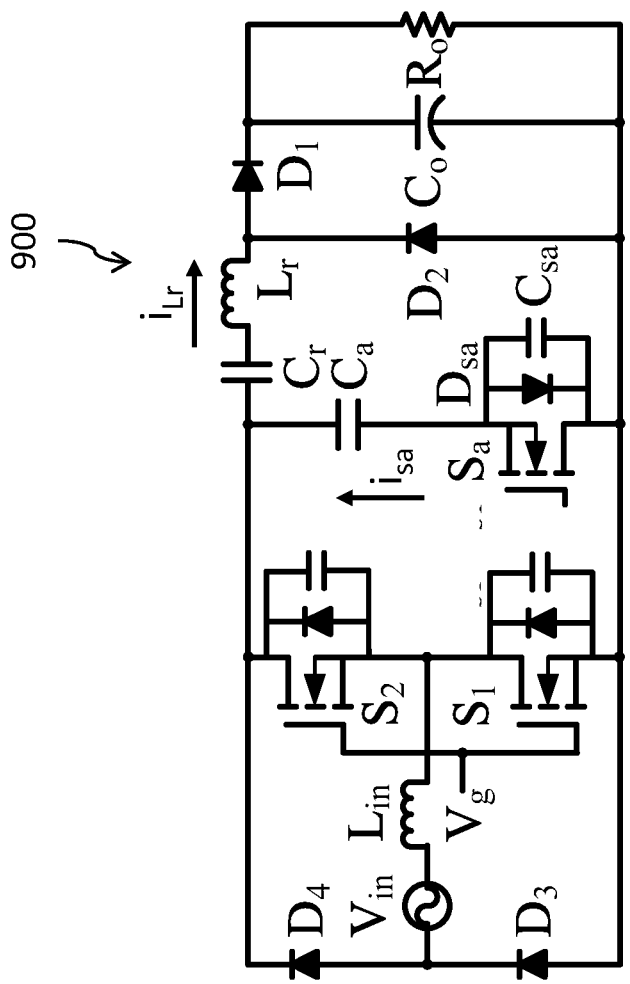
FIG. 10B shows reference directions on the circuit of FIG. 9 for the currents in FIG. 10A.

The signs of the currents (positive vs negative) are determined with reference to the directions shown in FIG. 5B and FIG. 10B. (The reference directions not shown in FIG. 10B are the same as the corresponding reference directions in FIG. 5B.)

Referring to FIG. 10A, a first time interval is defined as time interval $(t_0-t_1)$. The first time interval starts when body capacitor $C_{s1}$ of switch $S_1$ is fully discharged and body capacitor $C_{sa}$ of switch $S_a$ is fully charged. The switch current $i_{s1}$ of switch $S_1$ is clamped by body diode $D_{s1}$ of switch $S_1$ to enable the ZVS turn-on of switch $S_1$. Gating signal $V_g$ initiates the ZVS turn-on condition for both switch $S_1$ and $S_2$. The first time interval ends when $i_{Lr}$ goes to zero and the circuit of FIG. 9 enters a hybrid resonant mode.

Figure 11:
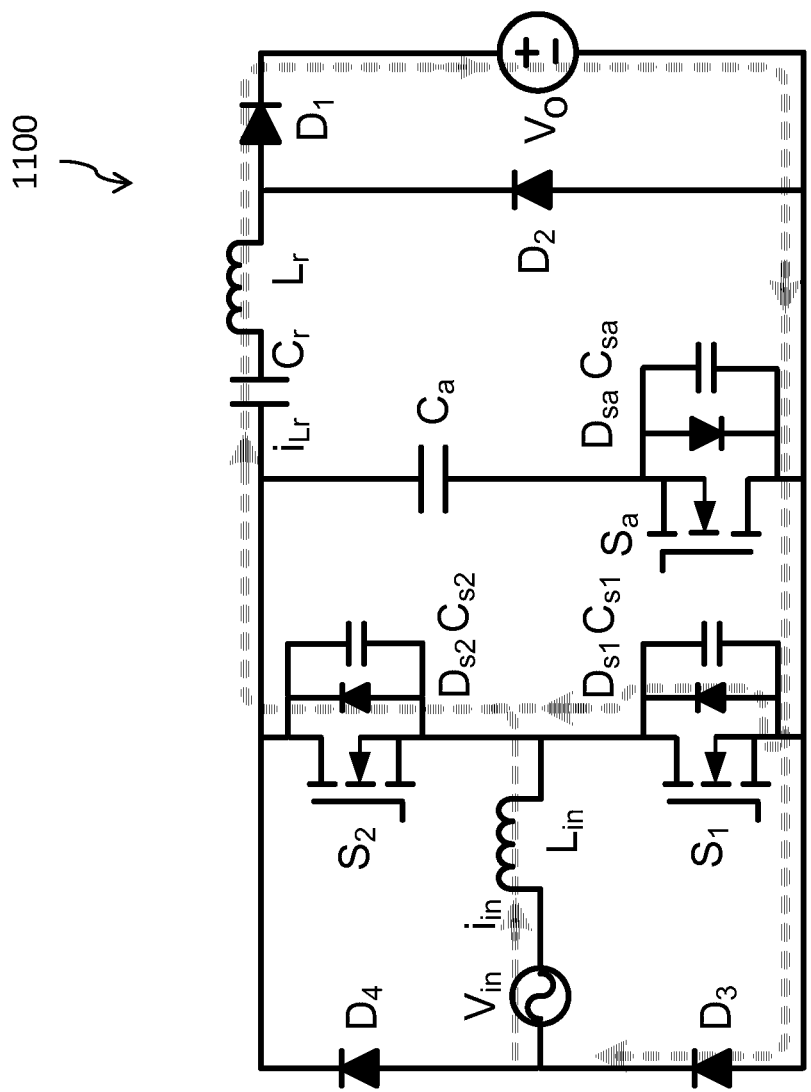
FIG. 11 illustrates the current path during positive half-line cycle operation for a first time interval of the waveforms of FIG. 10A.

FIG. 11 illustrates the current path during positive half-line cycle operation for the first time interval of waveforms 1000 of FIG. 10A.

Referring again to FIG. 10A, a second time interval is defined as time interval $(t_1-t_2)$. During the second time interval, switch current $i_{s1}$ is the sum of input current $i_{in}$ and the negative of the resonant current $i_{Lr}$. Input current $i_{in}$ stores energy in input inductor $L_{in}$. The second time interval ends when resonant current $i_{Lr}$ returns to substantially zero, which enables diode $D_2$ to turn off with zero-current-switching (ZCS).

Figure 12:
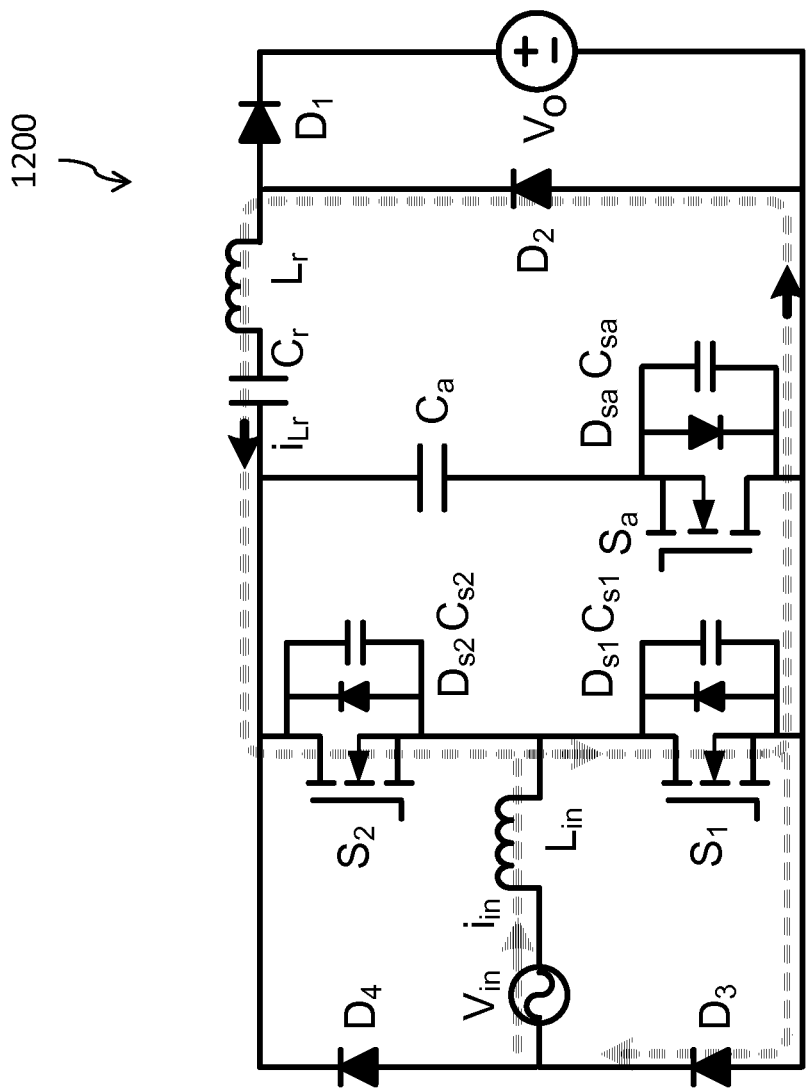
FIG. 12 illustrates the current path during positive half-line cycle operation for a second time interval of the waveforms of FIG. 10A.

FIG. 12 illustrates the current path during positive half-line cycle operation for the second time interval of the waveforms of FIG. 10A.

Referring again to FIG. 10A, a third time interval is defined as time interval $(t_2-t_3)$. The third time interval starts when $D_2$ stops conducting and there is no current in the resonant branch. In the third interval, input inductor $L_{in}$ stores energy in a manner similar to traditional boost operation. The third time interval ends when switch $S_1$ is turned off.

Figure 13:
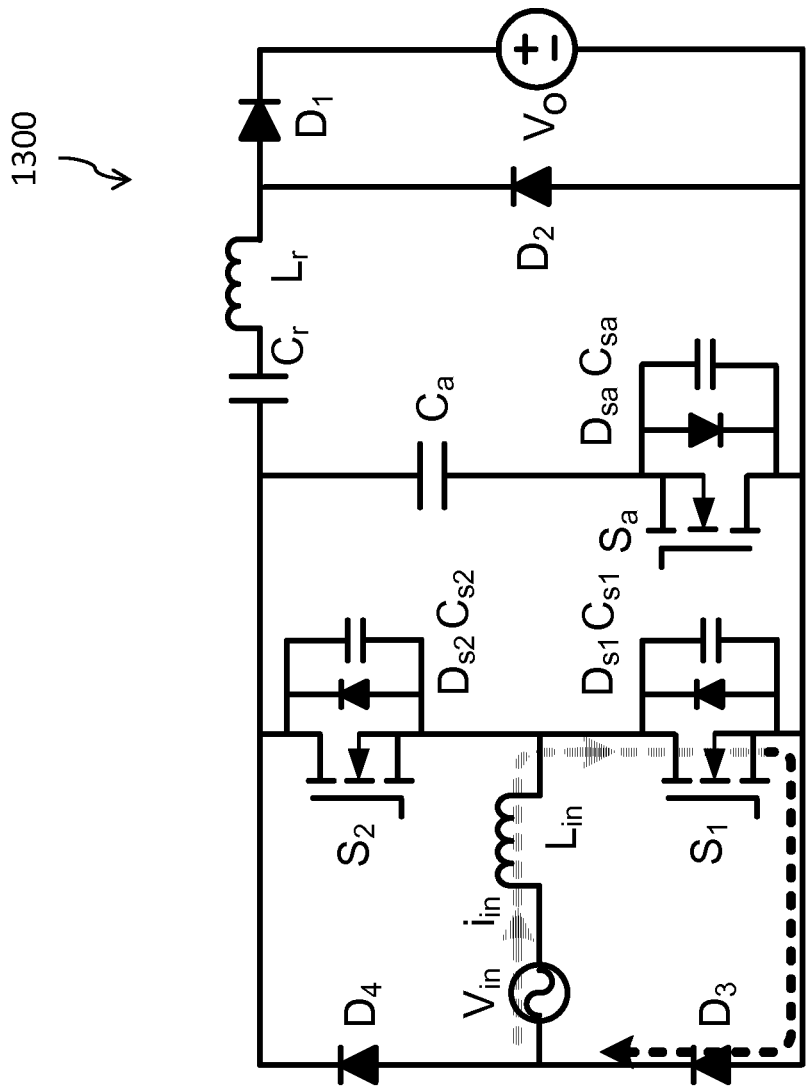
FIG. 13 illustrates the current path during positive half-line cycle operation for a third time interval of the waveforms of FIG. 10A.

FIG. 13 illustrates the current path during positive half-line cycle operation for the third time interval of the waveforms of FIG. 10A.

Referring again to FIG. 10A, a fourth time interval is defined as time interval $(t_3-t_4)$. At time $t_3$, switch $S_1$ is turned off. At time $t_4$, switch $S_a$ is turned on. During a first part of the fourth time interval, input current $i_{in}$ charges body capacitor $C_{s1}$ of switch $S_1$, and discharges body capacitor $C_{sa}$ of switch $S_a$. During a second part of the fourth time interval that follows the first part, switch current $i_{sa}$ of switch $S_a$ is clamped by body diode, $D_{sa}$ of switch $S_a$.

Figure 14:
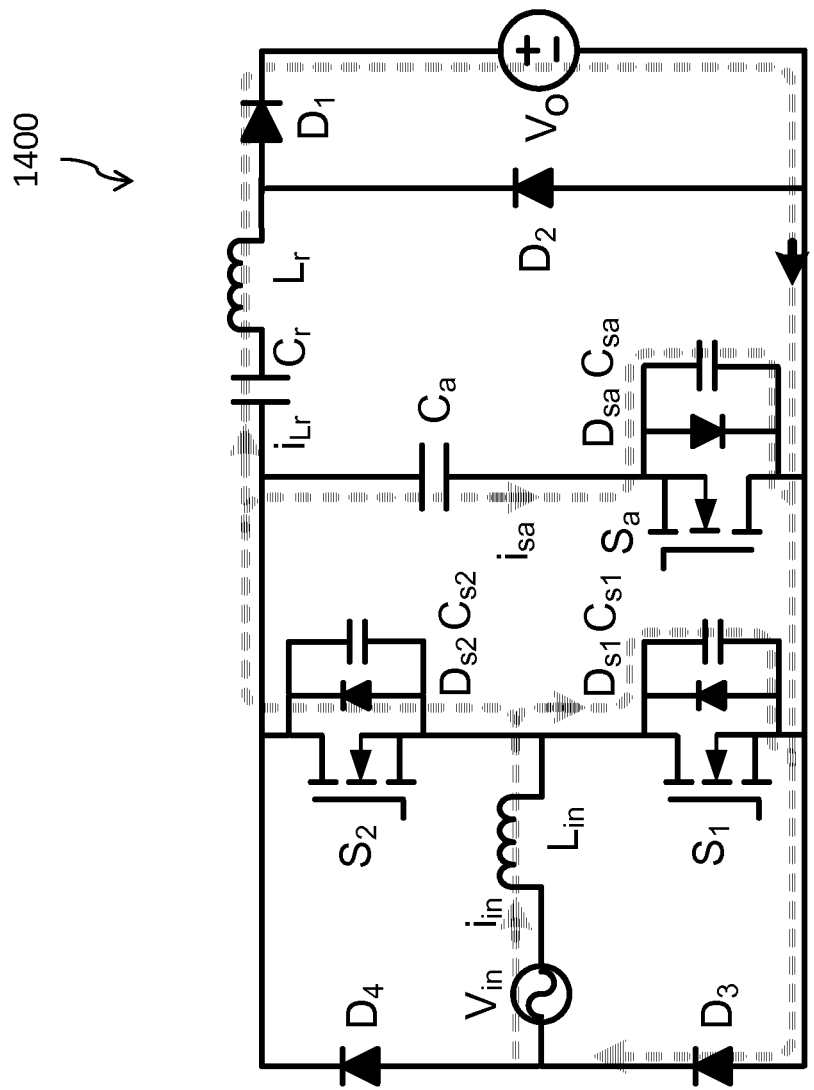
FIG. 14 illustrates the current path during positive half-line cycle operation for a first part of a fourth time interval of the waveforms of FIG. 10A.

FIG. 14 illustrates the current path during positive half-line cycle operation for the first part of the fourth time interval of the waveforms of FIG. 10A.

Figure 15:
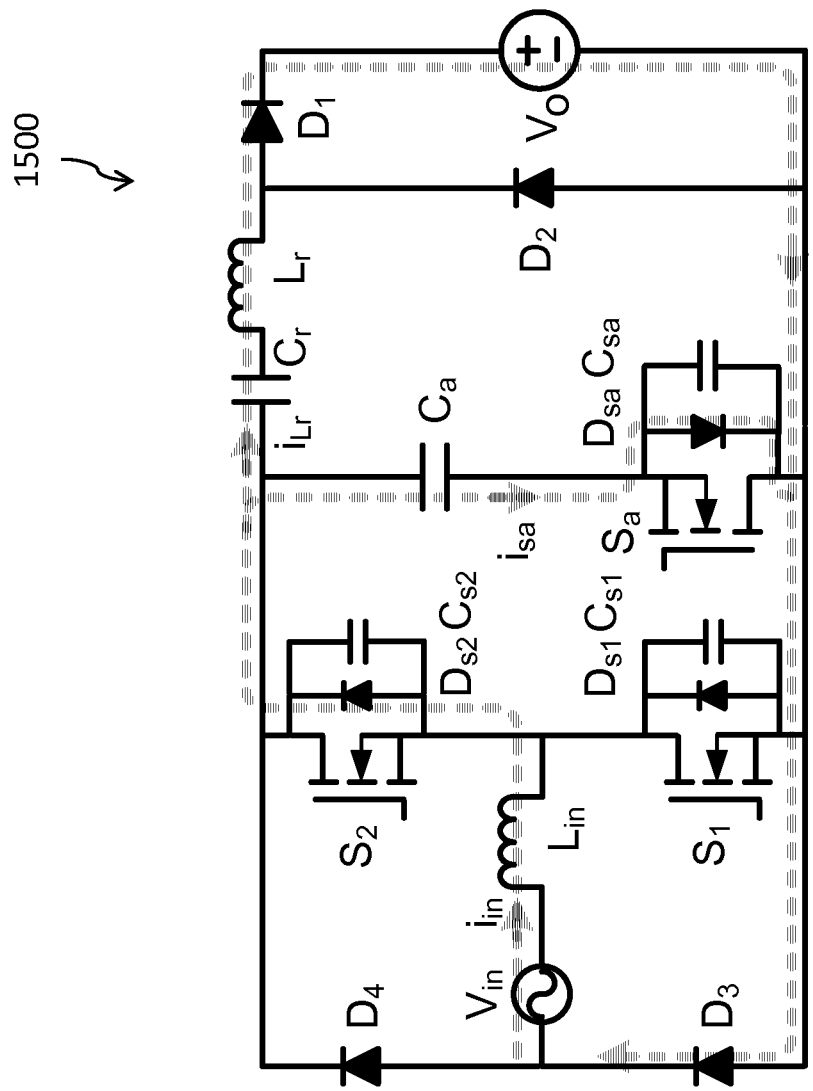
FIG. 15 illustrates the current path during positive half-line cycle operation for a second part of a fourth time interval of the waveforms of FIG. 10A.

FIG. 15 illustrates the current path during positive half-line cycle operation for the second part of the fourth time interval of the waveforms of FIG. 10A.

Referring again to FIG. 10A, a fifth time interval is defined as time interval $(t_4-t_5)$. During the fifth time interval, a gating signal $V_{ga}$ (not shown in FIG. 9) for switch $S_a$ enables zero-voltage-switching (ZVS) turn-on of switch $S_a$. The fifth time interval ends when $i_{sa}$ goes from negative to positive (that is, when the current through switch $S_a$ changes direction).

Figure 16:
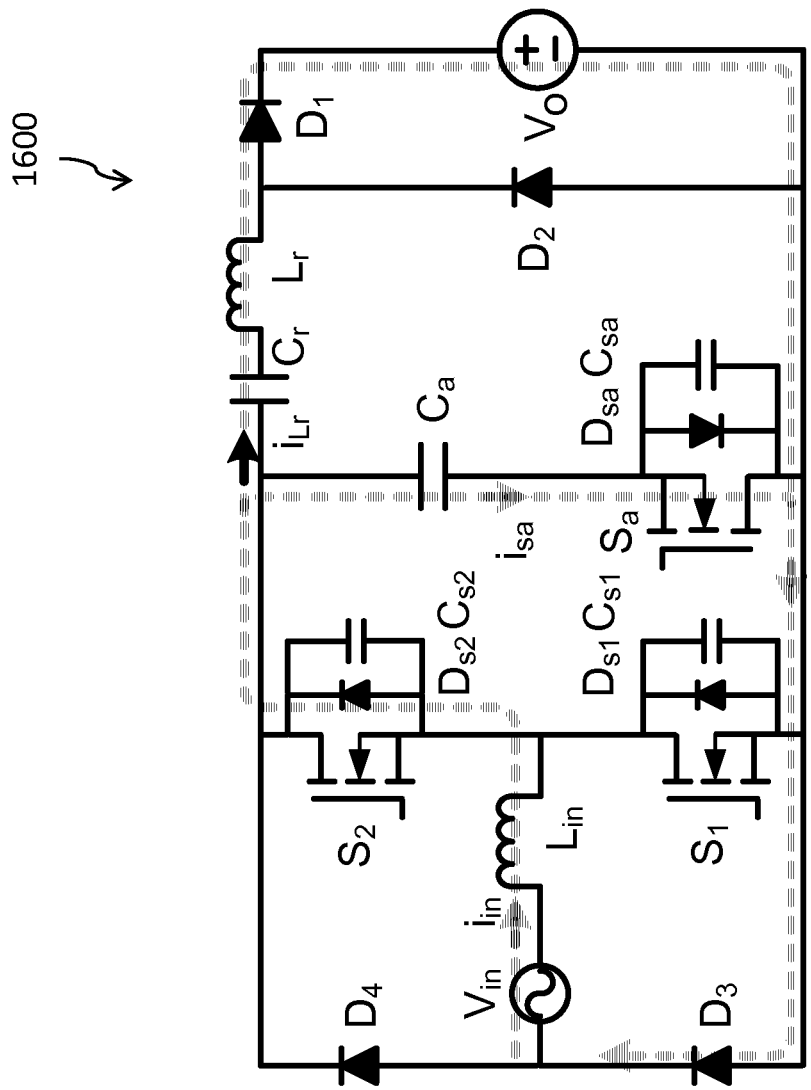
FIG. 16 illustrates the current path during positive half-line cycle operation for a fifth time interval of the waveforms of FIG. 10A.

FIG. 16 illustrates the current path during positive half-line cycle operation for the fifth time interval of the waveforms of FIG. 10A.

Referring again to FIG. 10A, a sixth time interval is defined as time interval $(t_5-t_6)$. The sixth time interval starts when resonant current $i_{Lr}$ equals input current $i_{in}$, and current $i_{sa}$ through switch $S_a$ starts flowing from its drain to source (that is, when current $i_{sa}$ through switch $S_a$ changes direction). The sixth time interval ends when switch $S_a$ is turned off.

Figure 17:
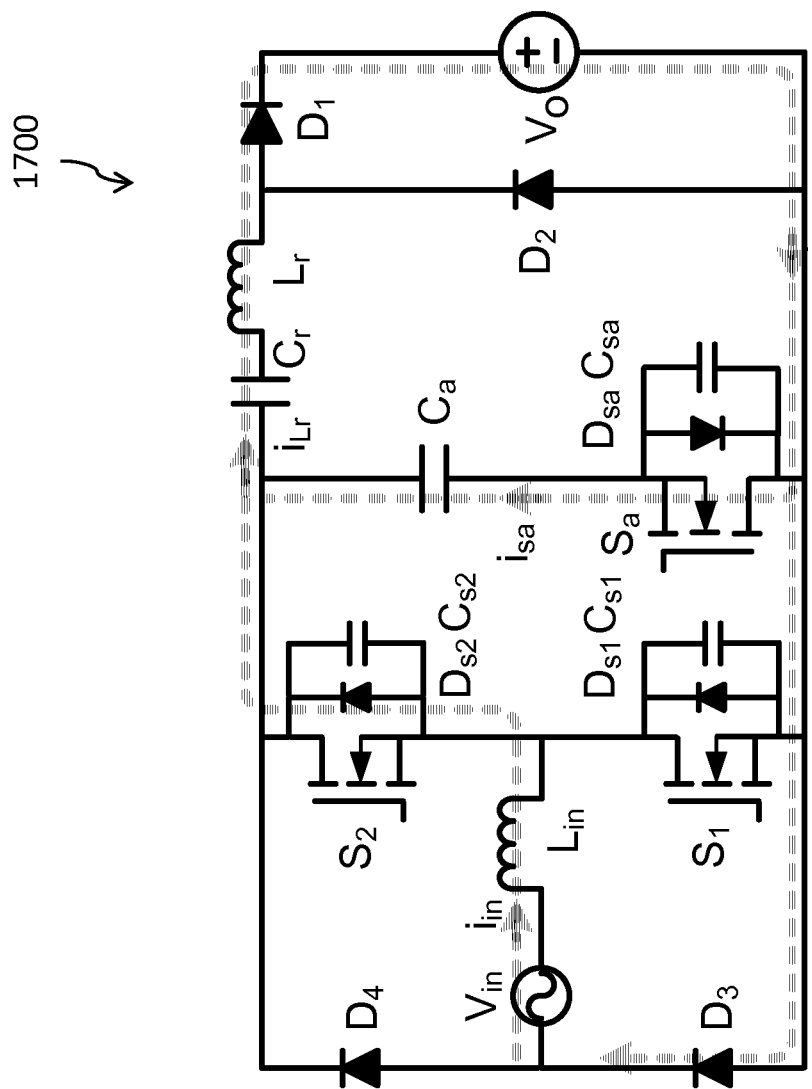
FIG. 17 illustrates the current path during positive half-line cycle operation for a sixth time interval of the waveforms of FIG. 10A.

FIG. 17 illustrates the current path during positive half-line cycle operation for the sixth time interval of the waveforms of FIG. 10A.

Referring again to FIG. 10A, a seventh time interval is defined as time interval $(t_6-t_7)$. During the seventh time interval, input current $i_{in}$ charges body capacitor $C_{sa}$ of switch $S_a$ and discharges body capacitor $C_{s1}$ of switch $S_1$. Current $i_{s1}$ through switch $S_1$ is clamped by body diode $D_{s1}$ of switch $S_1$ in the next time interval, which is the same as the first time interval described above. The sequence of time intervals—from the first time interval to the seventh time interval—repeats. In other words, $t_7$ corresponds to $t_0$ and the start of a new first time interval.

Figure 18:
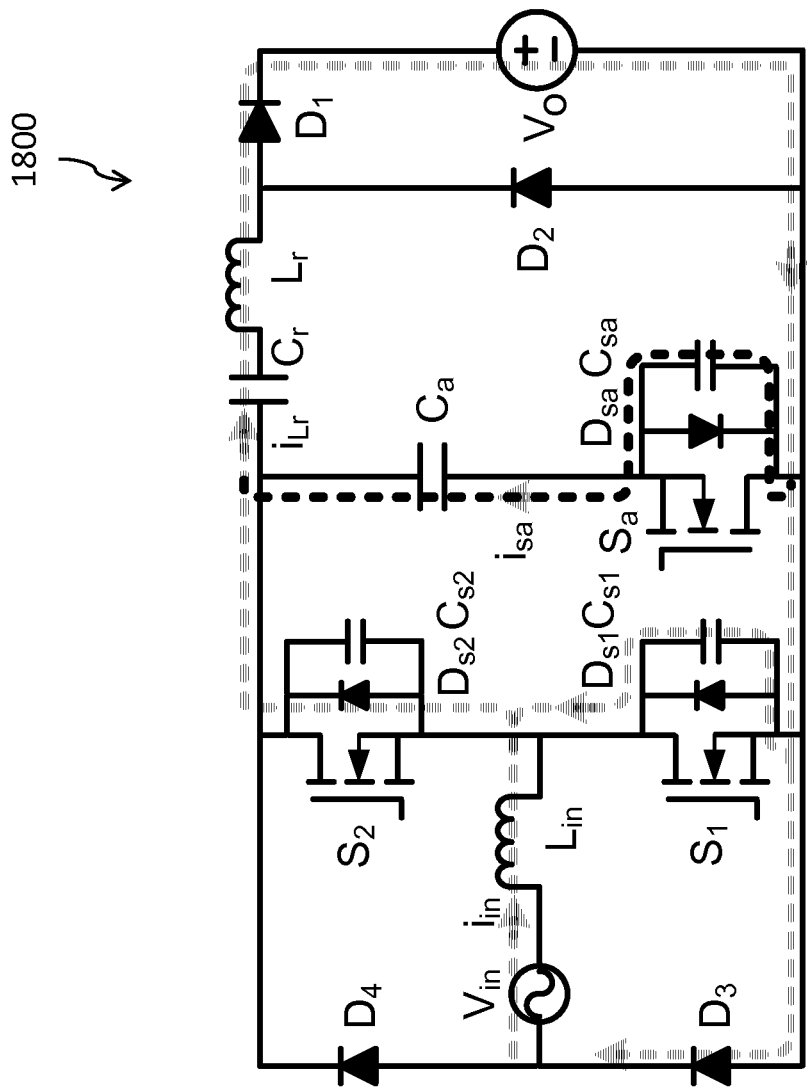
FIG. 18 illustrates the current path during positive half-line cycle operation for a seventh time interval of the waveforms of FIG. 10A.

FIG. 18 illustrates the current path during positive half-line cycle operation for the seventh time interval of the waveforms of FIG. 10A.

To achieve ZVS for switch $S_1$, it must be turned on during the first time interval, with some delay after $t_0$. At $t_0$ body capacitor $C_{s1}$ is essentially fully discharged and $S_1$ is ready to be turned on. Switch $S_1$ is turned on when gating signal $V_g$ goes high. If it is not turned on during the first time interval, then body capacitor $C_{s1}$ of switch $S_1$ recharges. The delay time between $t_0$ and the time that $V_g$ goes high to turn on switch $S_1$ is configured to allow sufficient time for current to flow in diode $D_{s1}$ whilst not allowing sufficient time for capacitor $C_{s1}$ to recharge. In a preferred embodiment, the delay time is approximately one quarter of the resonant period formed by $L_r$ and $C_{s1}$.

Referring again to FIG. 10A, there is a delay $td_1$ (not labeled in FIG. 10A) between $V_g$ going low and $V_{ga}$ going high. Similarly, there is a delay $td_2$ (not labeled in FIG. 10A) between $V_{ga}$ going low and $V_g$ going high. In one embodiment, $td_2$ is greater than $td_1$. In another embodiment, $td_1$ is greater than $td_2$.

The introduction of delays $td_1$ and $td_2$ enables ZVS for switches $S_1$, $S_2$ and $S_a$.

In addition, there must also be sufficient energy stored in resonant inductor $L_r$ to completely discharge $C_{s1}$.

ZVS for switch $S_a$ is achieved when PWM switches $S_1$ and $S_2$ are turned off at time $t_3$. At time $t_3$, there must also be sufficient energy stored in input inductor $L_{in}$ to completely discharge switch capacitance $C_{sa}$.

In an example application of HRPWM ZVS converter 900, the output power is 650 W, the AC input voltage is in the range 85V to 265V, the output voltage is 400V, and the switching frequency is 70 kHz. In a preferred embodiment for the example application, resonant capacitor $C_r$ is 1 µF and resonant inductor $L_r$ is 20 µH.

HRPWM ZVS converter 900 has no diode bridge rectifier (such as diode bridge rectifier 110 of FIG. 1) and consequently has reduced heat management complexity relative to single-stage boost converter 100 of FIG. 1 and other converters comprising a diode bridge rectifier.

For an example embodiment of HRPWM ZVS converter 900 with 70 kHz switching frequency, 120 V input and 650 W load, switching losses can be reduced by approximately 9 W and regular diode conduction losses can be reduced by approximately 3 W, when compared to a conventional AC-DC boost converter. Taking into account a performance penalty for including components additional to those typically found in the conventional AC-DC boost converter, the example embodiment of HRPWM ZVS converter 900 can be configured to reduce net losses by approximately 5 W (or 15% of the losses) at full load.

At higher switching frequencies than 70 kHz, HRPWM ZVS converter 900 can be configured to provide a higher reduction in losses.

Since HRPWM ZVS converter 900 is configured so that switches $S_1$, $S_2$ and $S_a$ are turned on with ZVS, HRPWM ZVS converter 900 exhibits reduced switching losses. In an example embodiment, HRPWM ZVS converter 900 can exhibit ZVS down to 650 W.

Resonant operation of HRPWM ZVS converter 900 reduces the reverse-recovery losses of body diodes $D_{s1}$ and $D_{s2}$ of MOSFET switches $S_1$, and $S_2$ respectively.

HRPWM ZVS converter 900 is configured so that its start-up in-rush current is low, and it has inherent lightning and surge protection.

Output diodes $D_1$ and $D_2$ are turned off with controlled rate of change of current and exhibit reduced reverse-recovery losses.

HRPWM ZVS converter 900 can operate with standard average current-mode control, and can operate in continuous conduction mode (CCM).

The voltage stress across switches $S_1$ and $S_2$ is close to the output voltage.

Figure 19:
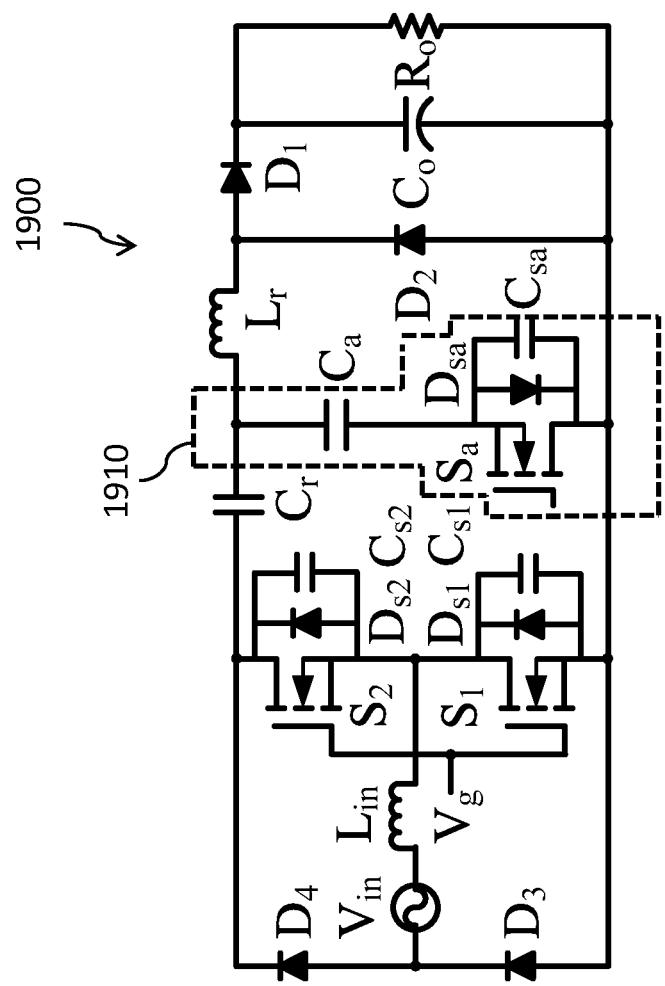
FIG. 19 is a circuit diagram of a second embodiment of a hybrid resonant PWM (HRPWM) zero-voltage-switching (ZVS) AC-DC converter, according to the teachings of the present application.

FIG. 19 is a circuit diagram of second embodiment of a hybrid resonant PWM (HRPWM) zero-voltage-switching (ZVS) AC-DC converter 1900. HRPWM ZVS converter 1900 is bridgeless and comprises switches $S_1$, and $S_2$, and associated diodes $D_{s1}$ and $D_{s2}$, and body capacitors $C_{s1}$ and $C_{s2}$ respectively.

HRPWM ZVS converter 1900 further comprises diodes $D_1$ through $D_4$, and resonant capacitor $C_r$ and resonant inductor $L_r$. HRPWM ZVS converter 1900 further comprises auxiliary circuit element 1910. Auxiliary circuit element 1910 comprises capacitor $C_a$, switch $S_a$ and associated body capacitor $C_{sa}$ and body diode $D_{sa}$.

HRPWM ZVS converter 1900 differs from HRPWM ZVS converter 900 in the positioning of auxiliary circuit element 1910 (of FIG. 19) and 910 (of FIG. 9).

In one embodiment of HRPWM ZVS converter 1900, switches $S_1$, $S_2$ and $S_a$, and associated diodes $D_{s1}$, $D_{s2}$ and $D_{sa}$, and body capacitors $C_{s1}$, $C_{s2}$ and $C_{sa}$, can be implemented using MOSFETs. HRPWM ZVS converter 1900 can achieve ZVS turn-on for switches $S_1$, $S_2$ and $S_a$.

The current waveforms and modes of operation of HRPWM ZVS converter 1900 are similar to those of HRPWM ZVS converter 900 of FIG. 9.

In an example application of HRPWM ZVS converter 1900, the output power is 650 W, the AC input voltage is in the range 85V to 265V, the output voltage is 400V, and the switching frequency is 70 kHz.

To limit the switch voltage stress (the sum of output voltage $V_o$ and resonant voltage $V_{Cr}$ across resonant capacitor Cr), it can be desirable to select components that can limit the resonant voltage $V_{Cr}$. In a preferred embodiment for the example application, resonant capacitor $C_r$ is 1 µF and resonant inductor $L_r$ is 20µH.

A benefit of HRPWM ZVS converter 1900 is that it reduces the voltage across $C_a$ allowing the use of a capacitor with a lower voltage rating.

Figure 20:
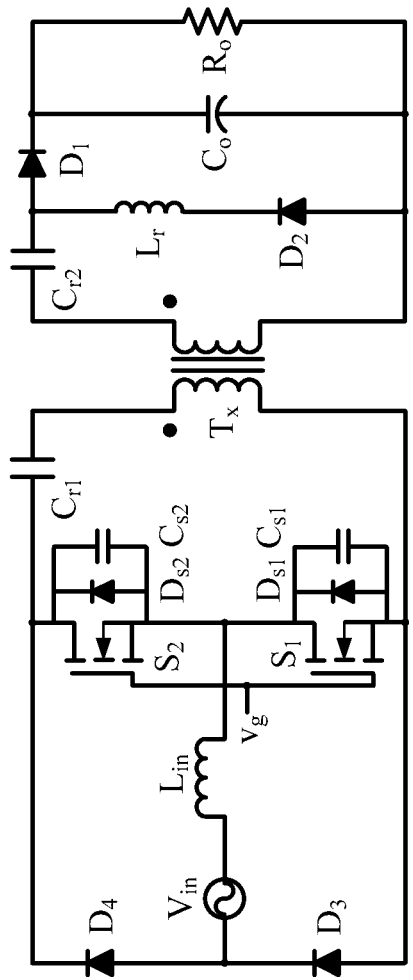
FIG. 20 is a circuit diagram of a first embodiment of an isolated HRPWM AC-DC converter, according to the teachings of the present application.

FIG. 20 is a circuit diagram of a first embodiment of an isolated HRPWM AC-DC converter 2000.

Isolated HRPWM AC-DC converter 2000 can be constructed from HRPWM AC-DC converter 400 of FIG. 4 by inserting an isolation transformer $T_X$. In effect, resonant capacitor Cr of FIG. 4 is replaced by two resonant capacitors $C_{r1}$ and $C_{r2}$, one on each side of isolation transformer $T_X$.

In the embodiment shown in FIG. 20, isolation transformer $T_X$ can operate substantially without storing DC energy, and therefore can operate without a reset circuit.

Figure 21:
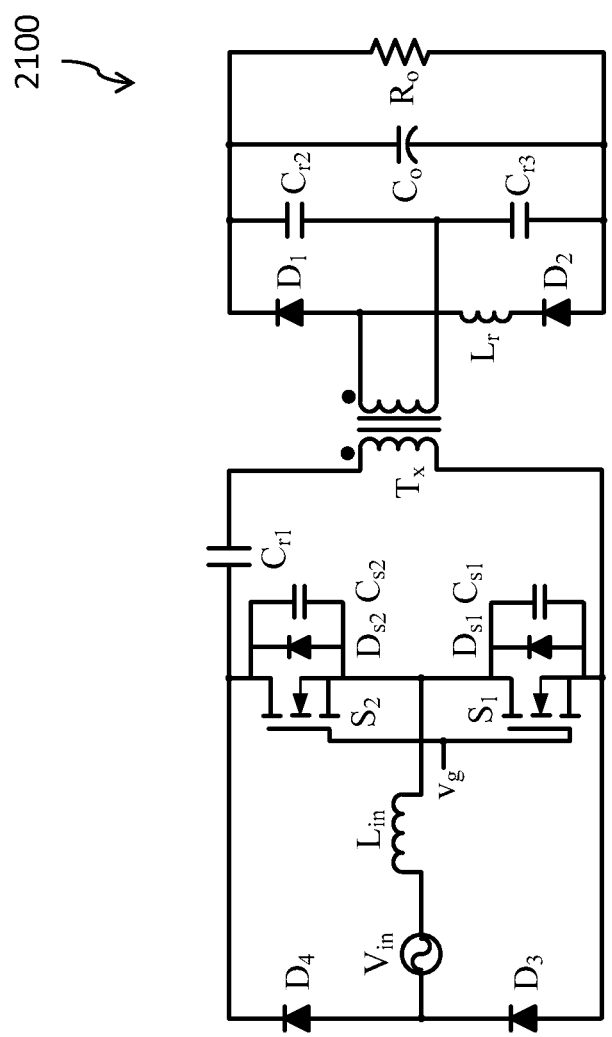
FIG. 21 is a circuit diagram of a second embodiment of an isolated HRPWM AC-DC converter, according to the teachings of the present application

FIG. 21 is a circuit diagram of a second embodiment of an isolated HRPWM AC-DC converter 2100. Isolated HRPWM AC-DC converter 2100 can be constructed from HRPWM AC-DC converter 400 of FIG. 4 by inserting an isolation transformer $T_X$.

Isolated HRPWM AC-DC converter 2100 comprises an isolation transformer $T_X$ and a resonant capacitor $C_{r1}$ on the primary side of transformer $T_X$. Isolated HRPWM AC-DC converter 2100 further comprises resonant capacitors $C_{r2}$ and $C_{r3}$, resonant inductor $L_r$, and diodes $D_1$ and $D_2$ on the secondary side of transformer $T_X$.

Figure 22:
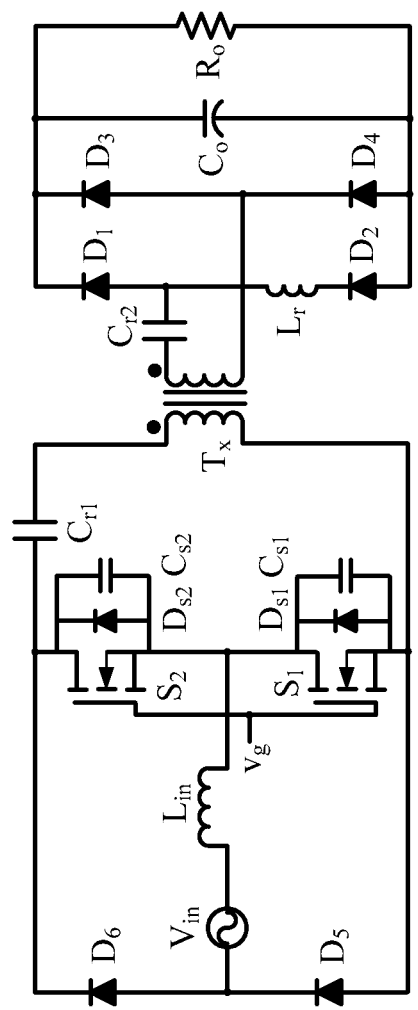
FIG. 22 is a circuit diagram of a third embodiment of an isolated HRPWM AC-DC converter, according to the teachings of the present application.

FIG. 22 is a circuit diagram of a third embodiment of an isolated HRPWM AC-DC converter. Isolated HRPWM AC-DC converter 2200 can be constructed from HRPWM AC-DC converter 400 of FIG. 4 by inserting an isolation transformer $T_X$.

Isolated HRPWM AC-DC converter 2200 comprises an isolation transformer $T_X$ and a resonant capacitor $C_{r1}$ on the primary side of transformer $T_X$. Isolated HRPWM AC-DC converter 2200 further comprises a resonant capacitor $C_{r2}$, resonant inductor $L_r$, and diodes $D_1$ through $D_4$ on the secondary side of transformer $T_X$.

Figure 23:
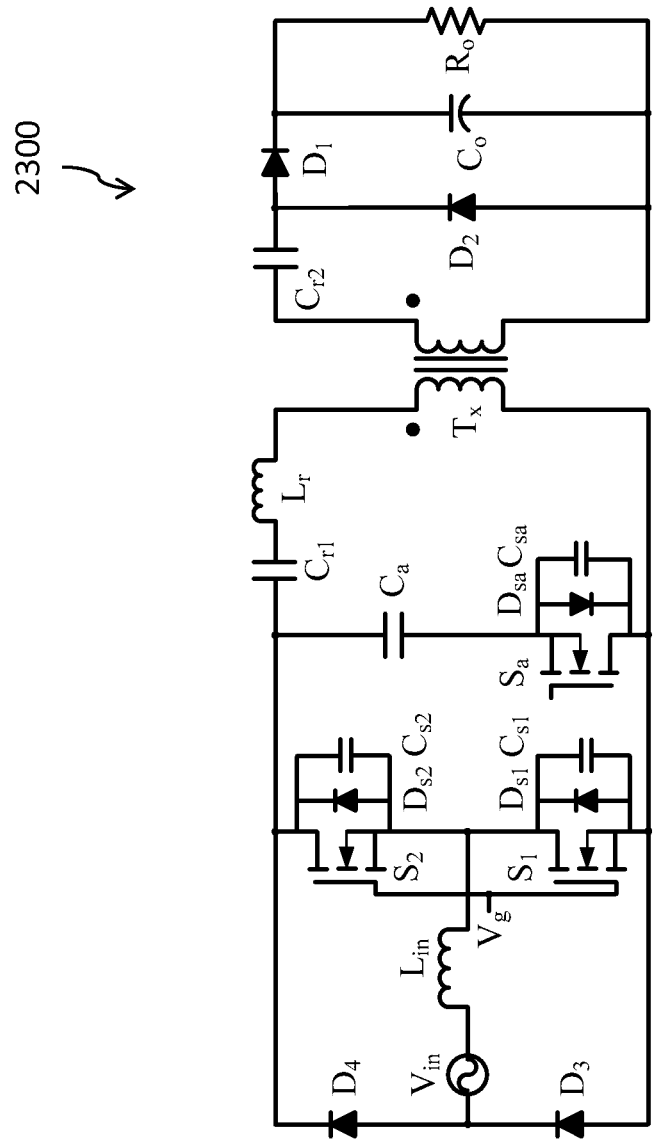
FIG. 23 is a circuit diagram of a first embodiment of an isolated HRPWM ZVS AC-DC converter, according to the teachings of the present application.

FIG. 23 is a circuit diagram of first embodiment of an isolated HRPWM ZVS AC-DC converter 2300.

Isolated HRPWM ZVS AC-DC converter 2300 can be constructed from HRPWM ZVS AC-DC converter 900 of FIG. 9 by inserting an isolation transformer $T_X$.

Isolated HRPWM ZVS AC-DC converter 2300 comprises an isolation transformer $T_X$ and a resonant capacitor $C_{r1}$ and resonant inductor $L_r$ on the primary side of transformer $T_X$. Isolated HRPWM ZVS AC-DC 2300 converter further comprises a resonant capacitor $C_{r2}$ and diodes $D_1$ and $D_2$ on the secondary side of transformer $T_X$.

Figure 24:
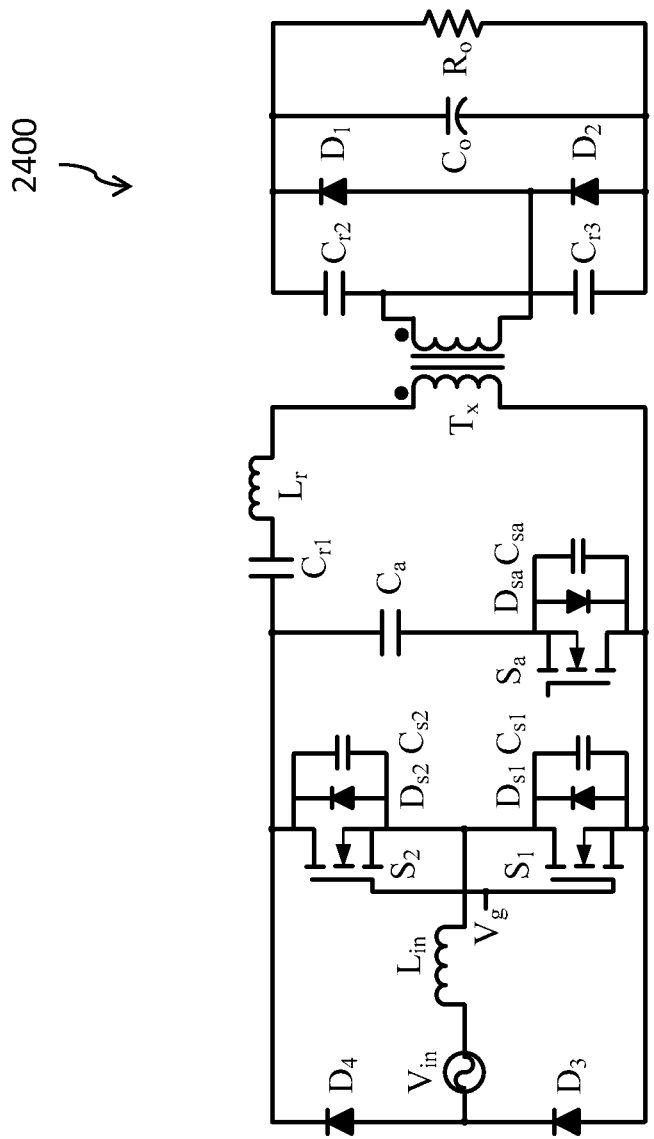
FIG. 24 is a circuit diagram of a second embodiment of an isolated HRPWM ZVS AC-DC converter, according to the teachings of the present application.

FIG. 24 is a circuit diagram of a second embodiment of an isolated HRPWM ZVS AC-DC converter 2400. HRPWM ZVS AC-DC converter 2400 is an isolated variant of HRPWM ZVS AC-DC converter 900 of FIG. 9.

Isolated HRPWM ZVS AC-DC converter 2400 comprises an isolation transformer $T_X$ and a resonant capacitor $C_{r1}$ and resonant inductor $L_r$ on the primary side of transformer $T_X$. Isolated HRPWM ZVS AC-DC converter 2400 further comprises resonant capacitors $C_{r2}$ and $C_{r3}$, and diodes $D_1$ and $D_2$ on the secondary side of transformer $T_X$.

Figure 25:
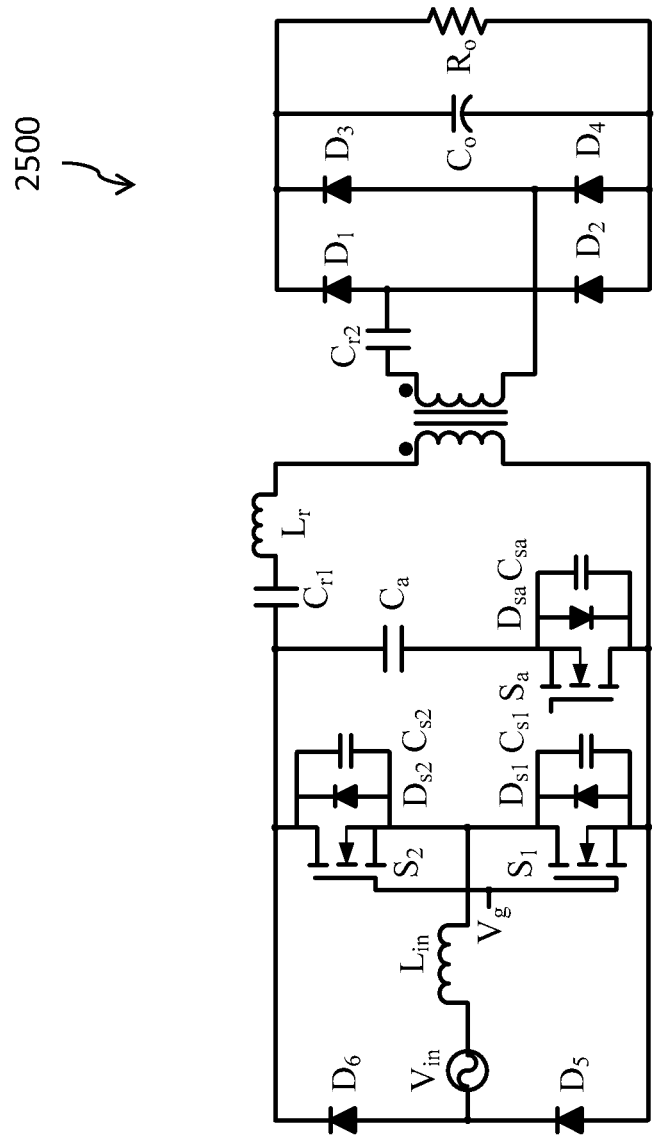
FIG. 25 is a circuit diagram of a third embodiment of an isolated HRPWM ZVS AC-DC converter, according to the teachings of the present application.

FIG. 25 is a circuit diagram of a third embodiment of an isolated HRPWM ZVS AC-DC converter 2500. HRPWM ZVS AC-DC converter 2500 is an isolated variant of HRPWM ZVS AC-DC converter 900 of FIG. 9.

Isolated HRPWM ZVS AC-DC converter 2500 comprises an isolation transformer $T_X$ and a resonant capacitor $C_{r1}$ and resonant inductor $L_r$ on the primary side of transformer $T_X$. Isolated HRPWM ZVS AC-DC converter 2500 further comprises a resonant capacitor $C_{r2}$, and diodes $D_1$ through $D_4$ on the secondary side of transformer $T_X$.

Figure 26:
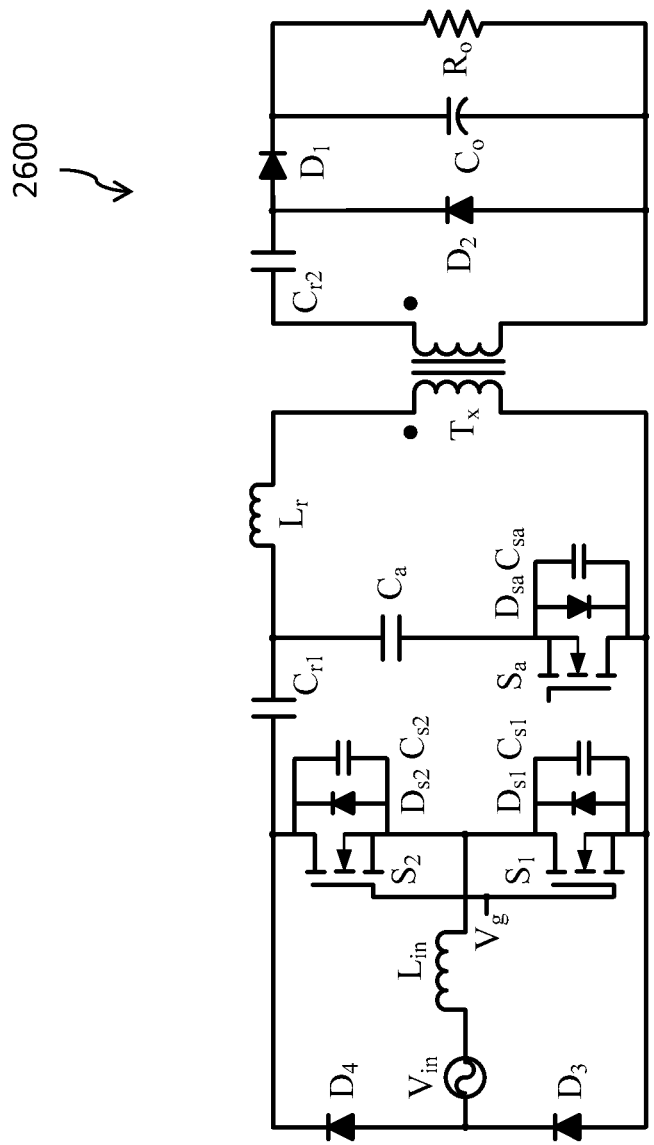
FIG. 26 is a circuit diagram of a fourth embodiment of an isolated HRPWM ZVS AC-DC converter, according to the teachings of the present application.

FIG. 26 is a circuit diagram of a fourth embodiment of an isolated HRPWM ZVS AC-DC converter 2600.

Isolated HRPWM AC-DC converter 2600 can be constructed from HRPWM AC-DC converter 1900 of FIG. 19 by inserting an isolation transformer $T_X$.

Figure 27:
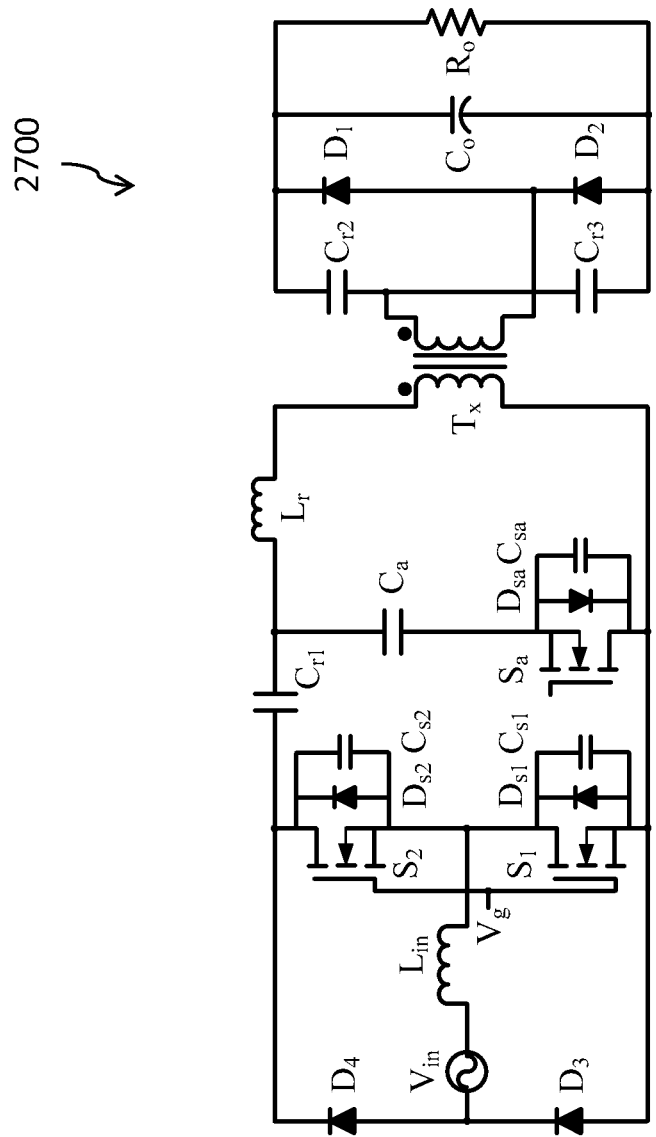
FIG. 27 is a circuit diagram of a fifth embodiment of an isolated HRPWM ZVS AC-DC converter, according to the teachings of the present application.

FIG. 27 is a circuit diagram of a fifth embodiment of an isolated HRPWM ZVS AC-DC converter 2700. HRPWM ZVS AC-DC converter 2700 is an isolated variant of HRPWM AC-DC converter 1900 of FIG. 19.

Figure 28:
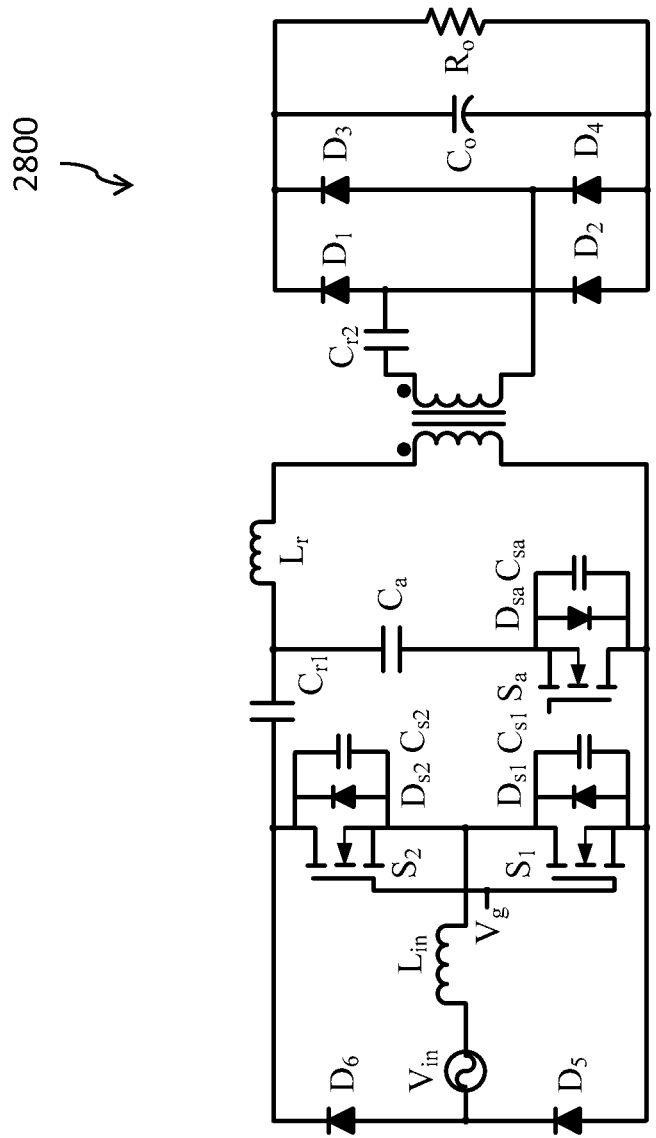
FIG. 28 is a circuit diagram of a sixth embodiment of an isolated HRPWM ZVS AC-DC converter, according to the teachings of the present application.

FIG. 28 is a circuit diagram of a sixth embodiment of an isolated HRPWM ZVS AC-DC converter 2800. HRPWM ZVS AC-DC converter 2800 is an isolated variant of HRPWM AC-DC converter 1900 of FIG. 19.

Figure 29:
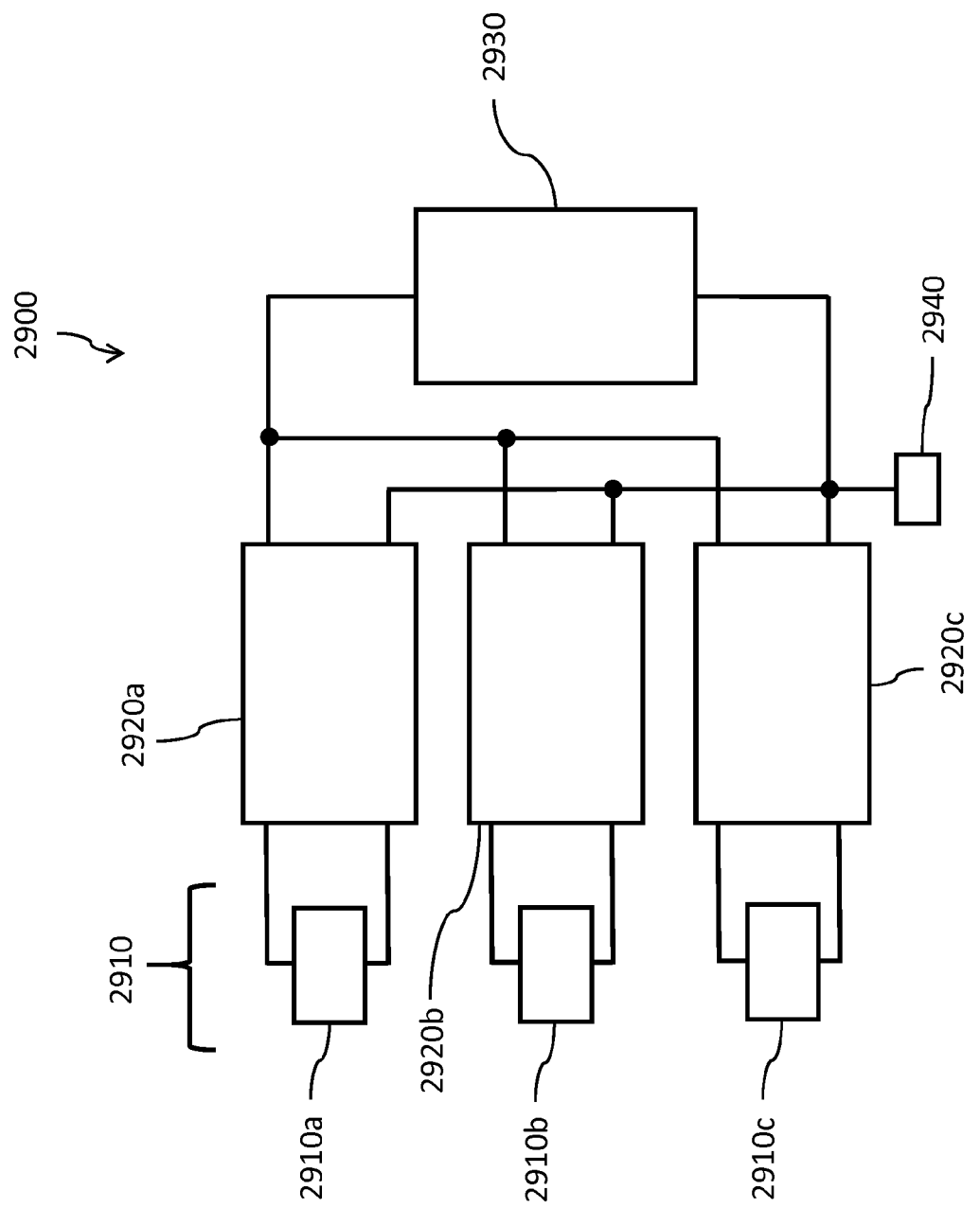
FIG. 29 is a block diagram illustrating a three-phase configuration, according to the teachings of the present application.

FIG. 29 is a block diagram illustrating a three-phase configuration 2900.

Three-phase configuration 2900 comprises three HRPWM AC-DC converters 2920A, 2920B and 2920C with a three-phase supply line 2910 comprising phases 2910A, 2910B and 2910C.

Three-phase configuration 2900 further comprises a common load 2930 and a ground 2940. In three-phase configuration 2900, three HRPWM AC-DC converters 2920A, 2920B and 2920C can be operated from three-phase supply line. 2910 into common load 2930.

Figure 30:
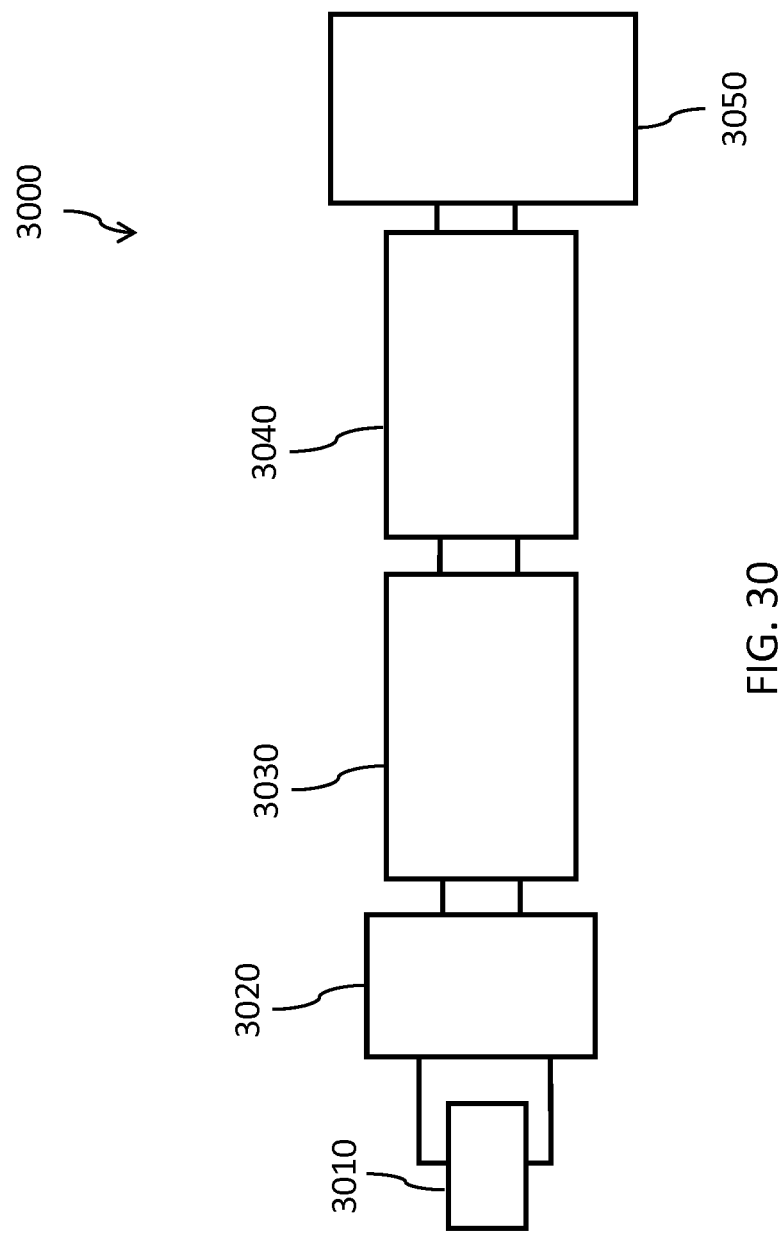
FIG. 30 is a block diagram illustrating a two-stage configuration, according to the teachings of the present application.

FIG. 30 is a block diagram illustrating a two-stage configuration 3000.

Two-stage configuration 3000 comprises an HRPWM AC-DC converter 3030 and a DC-DC converter 3040. Two-stage configuration 3000 further comprises an input supply voltage 3010 and a load 3050. Two-stage configuration 3000 can optionally comprise filtering or protection circuits 3020.

HRPWM AC-DC converter 3030 can generate an intermediate voltage for input to DC-DC converter 3040. DC-DC converter 3040 can generate an output voltage suitable for load 3050.

In some embodiments, HRPWM AC-DC converter 3030 can be isolated. In other embodiments, DC-DC converter 3040 can be isolated.

Input supply voltage 3010 can be obtained from an AC mains grid or from an AC power generator.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An AC-DC converter comprising:
a first AC voltage source input node connectable to a first AC input line;
a second AC voltage source input node connectable to a second AC input line;
an input inductor electrically coupled between the first AC voltage source input node and a central node;
a first switch electrically coupled between the central node and a first rail node, the first switch having a body diode oriented to pass current from the first rail node to the central node;
a second switch electrically coupled between the central node and a second rail node, the second switch having a body diode oriented to pass current from the central node to the second rail node;
a first input device electrically coupled between the first rail node and the second AC voltage source input node and oriented to pass current from the first rail node to the second AC voltage source input node, the first input device selected from the group consisting of a diode and a switch;
a second input device electrically coupled between the second rail node and the second AC voltage source input node and oriented to pass current from the second AC voltage source input node to the second rail node, the second input device selected from the group consisting of a diode and a switch;
an output circuit electrically coupled between the second rail node and the first rail node, the output circuit comprising a resonant circuit electrically connectable to a load; and
a controller communicatively coupled to provide control signals to operate the first and the second switches at a first switching frequency.

2. The AC-DC converter of claim 1, wherein the output circuit comprises a resonant capacitor, a resonant inductor, and a first output device, the resonant capacitor, the resonate inductor and the first output device electrically coupled in series with one another between the first and the second rail nodes, the first output device selected from the group consisting of a diode and a switch.

3. The AC-DC converter of claim 2 wherein the controller operates the first and the second switches at the first switching frequency which is lower than a resonant frequency set by the resonant inductor and the resonant capacitor.

4. The AC-DC converter of claim 2 wherein the output circuit further comprises a second output device electrically coupled to pass current from a node between the resonant inductor and the resonant capacitor via the load to the first rail node, the second output device selected from the group consisting of a diode and a switch.

5. The AC-DC converter of claim 2 wherein the output circuit further comprises an auxiliary circuit electrically coupled between the first rail node and the second rail node, and a second output device electrically coupled to pass current from a node between the resonant inductor and the first output device via the load to the first rail node, the second output device selected from the group consisting of a diode and a switch.

6. The AC-DC converter of claim 5 wherein the auxiliary circuit comprises an auxiliary capacitor and an auxiliary switch electrically coupled in series with one another between the first and the second rail nodes, the auxiliary switch comprising a body diode oriented to pass current from the second rail node to the first rail node.

7. The AC-DC converter of claim 6 wherein the controller is further communicatively coupled to drive the auxiliary switch to switch in response to a zero-crossing event of at least one of a current or a voltage.

8. The AC-DC converter of claim 2 wherein the output circuit further comprises an auxiliary circuit electrically coupled between a node between the resonant capacitor and the resonant inductor to the first rail node, and a second output device electrically coupled to pass current from a node between the resonant inductor and the first output device via the load to the first rail node, the second output device selected from the group consisting of a diode and a switch.

9. The AC-DC converter of claim 8 wherein the auxiliary circuit comprises an auxiliary capacitor and an auxiliary switch electrically coupled between a node between the resonant capacitor and the resonant inductor to the first rail node, the auxiliary switch comprising a body diode oriented to pass current from the node between the resonant capacitor and the resonant inductor to the first rail node.

10. The AC-DC converter of claim 1 wherein the AC-DC converter operates in continuous conduction mode wherein current flows continuously in the input inductor.

11. The AC-DC converter of claim 1 wherein the controller provides control signals to operate the switches in either pulse width modulation mode or hybrid resonant mode.

12. The AC-DC converter of claim 1 wherein the first and the second switches are electrically coupled to receive a common control signal from the controller.

13. The AC-DC converter of claim 1 further comprising a common output for connecting across a common load, wherein the first and the second AC voltage source input nodes are electrically connected to the first AC line and the second AC line of a first phase AC input of a three-phase AC supply line.

14. The AC-DC converter of claim 1 wherein the output circuit comprises:
a first resonant capacitor; and
an isolation transformer having a primary winding and a secondary winding, the first resonant capacitor and the primary winding of the isolation transformer electrically coupled in series between the second rail node and the first rail node.

15. The AC-DC converter of claim 14 wherein the output circuit further comprises:
a second resonant capacitor;
a resonant inductor; and
a first output device selected from the group consisting of a diode and a switch, the second resonant capacitor, the resonant inductor and the first output device each electrically coupled in series with one another across the secondary winding of the isolation transformer.

16. The AC-DC converter of claim 15 wherein the output circuit further comprises a second output device electrically coupled to pass current from a node between the resonant capacitor and the resonant inductor via the load to the secondary winding of the isolation transformer, the second output device selected from the group consisting of a diode and a switch.

17. The AC-DC converter of claim 14 wherein the output circuit further comprises:
a second resonant capacitor;
a third resonant capacitor;
a resonant inductor;
a first output device selected from the group consisting of a diode and a switch; and
a second output device selected from the group consisting of a diode and a switch, the first output device and the second resonant capacitor electrically coupled in series with one another across the secondary winding of the isolation transformer, the second output device, the third resonant capacitor, and the resonant inductor electrically coupled in series with one another across the secondary winding of the isolation transformer, electrically coupled in parallel with the first output device and the second resonant capacitor.

18. The AC-DC converter of claim 14 wherein the output circuit further comprises:
a second resonant capacitor;
a resonant inductor;
a first output device selected from the group consisting of a diode and a switch;
a second output device selected from the group consisting of a diode and a switch,
a third output device selected from the group consisting of a diode and a switch; and
a fourth output device selected from the group consisting of a diode and a switch, the second resonant capacitor, the first output device and the third output device electrically coupled in series with one another across the secondary winding of the isolation transformer, the resonant inductor, the second output device and the fourth output device electrically coupled in series with one another across the secondary winding of the isolation transformer, electrically coupled in parallel with the second resonant capacitor, the first output device and the third output device.

19. The AC-DC converter of claim 14 wherein the output circuit further comprises:
a resonant inductor electrically coupled in series with the first resonant capacitor; and
an auxiliary circuit electrically coupled between the first rail node and the second rail node, the auxiliary circuit comprising an auxiliary capacitor and an auxiliary switch, the auxiliary switch comprising a body diode oriented to pass current from the second rail node to the first rail node.

20. The AC-DC converter of claim 14 wherein the output circuit further comprises:
a resonant inductor electrically coupled in series with the first resonant capacitor; and
an auxiliary circuit electrically coupled to pass current from a node between the first resonant capacitor and the resonant inductor to the first rail node, the auxiliary circuit comprising an auxiliary capacitor and an auxiliary switch, the auxiliary switch comprising a body diode oriented to pass current from the second rail node to the first rail node.

21. A two-stage AC-DC converter comprising a first AC-DC stage and a second DC-DC stage, the first AC-DC stage comprising:
a first AC voltage source input node connectable to a first AC input line;
a second AC voltage source input node connectable to a second AC input line;
an input inductor electrically coupled between the first AC voltage source input node and a central node;
a first switch electrically coupled between the central node and a first rail node, the first switch having a body diode oriented to pass current from the first rail node to the central node;
a second switch electrically coupled between the central node and a second rail node, the second switch having a body diode oriented to pass current from the central node to the second rail node;
a first input device electrically coupled between the first rail node and the second AC voltage source input node and oriented to pass current from the first rail node to the second AC voltage source input node, the first input device selected from the group consisting of a diode and a switch;
a second input device electrically coupled between the second rail node and the second AC voltage source input node and oriented to pass current from the second AC voltage source input node to the second rail node, the second input device selected from the group consisting of a diode and a switch;
a controller communicatively coupled to provide control signals to operate the first and the second switches at a first switching frequency; and
an output circuit electrically coupled between the second rail node and the first rail node, the output circuit comprising a resonant circuit electrically connected to the second DC-DC stage, the second DC-DC stage electrically connectable to a load.

22. The two-stage AC-DC converter of claim 21 wherein the first AC-DC stage has a first output DC voltage, and the second DC-DC stage has a second output DC voltage, the first output DC voltage different from the second output DC voltage.

* * * * *